United States Patent
Schorsch et al.

(10) Patent No.: US 10,007,355 B2
(45) Date of Patent: Jun. 26, 2018

(54) GESTURE-BASED INFORMATION EXCHANGE BETWEEN DEVICES IN PROXIMITY

(71) Applicant: Apple Inc., Cupertino, CA (US)

(72) Inventors: Brent W. Schorsch, San Jose, CA (US); David J. Shoemaker, Redwood City, CA (US); Eugene Dvortsov, San Francisco, CA (US); Kamlesh Kudchadkar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days. days.

(21) Appl. No.: 15/102,834

(22) PCT Filed: Dec. 18, 2013

(86) PCT No.: PCT/US2013/076063
§ 371 (c)(1),
(2) Date: Jun. 8, 2016

(87) PCT Pub. No.: WO2015/094220
PCT Pub. Date: Jun. 25, 2015

(65) Prior Publication Data
US 2017/0038847 A1 Feb. 9, 2017

(51) Int. Cl.
*G09G 5/00* (2006.01)
*G06F 3/0346* (2013.01)
*G06F 3/01* (2006.01)
*H04W 4/80* (2018.01)
(Continued)

(52) U.S. Cl.
CPC .............. *G06F 3/017* (2013.01); *G06F 1/163* (2013.01); *G06F 3/0346* (2013.01); *H04L 67/12* (2013.01); *H04L 67/125* (2013.01); *H04L 67/18* (2013.01); *H04W 4/023* (2013.01); *H04W 4/80* (2018.02); *H04W 8/24* (2013.01);
(Continued)

(58) Field of Classification Search
CPC . G06F 19/3406; G06F 21/35; G06F 17/30864
See application file for complete search history.

(56) References Cited

U.S. PATENT DOCUMENTS 8,165,523 B2    4/2012    Mäkelä et al.
8,170,212 B2    5/2012    Pering et al.
(Continued)

FOREIGN PATENT DOCUMENTS

EP    2 302 881 A1    3/2011
EP    2 458 831 A1    5/2012
WO    2010/023459 A1    3/2010

OTHER PUBLICATIONS

International Preliminary Search Report and Written Opinion dated Jun. 30, 2014 in International Application No. PCT/US2013/076063. 9 pages.
(Continued)

*Primary Examiner* — Nan-Ying Yang
(74) *Attorney, Agent, or Firm* — Kilpatrick Townsend & Stockton LLP

(57) ABSTRACT

Information items can be exchanged between user devices worn or carried by two different users in response to the devices detecting a "greeting event" in which the devices are in proximity and the users of the devices concurrently execute a greeting gesture. In response to detecting an event, each device can select zero or more information items or data objects to send to the other, with the selection being based on contextual information available to the device making the selection.

17 Claims, 11 Drawing Sheets

(51) Int. Cl.
  H04W 12/04 (2009.01)
  G06F 1/16 (2006.01)
  H04W 4/02 (2018.01)
  H04W 8/24 (2009.01)
  *H04L 29/06* (2006.01)
  *H04M 1/725* (2006.01)
  *H04L 29/08* (2006.01)
  *H04W 12/02* (2009.01)

(52) U.S. Cl.
  CPC ........... *H04W 12/04* (2013.01); *H04L 63/061* (2013.01); *H04L 67/36* (2013.01); *H04M 1/7253* (2013.01); *H04M 2203/2094* (2013.01); *H04M 2250/02* (2013.01); *H04M 2250/04* (2013.01); *H04M 2250/06* (2013.01); *H04M 2250/12* (2013.01); *H04W 12/02* (2013.01)

(56) References Cited

U.S. PATENT DOCUMENTS

| | | |
|---|---|---|
| 8,219,028 B1 | 7/2012 | Flamholz |
| 8,391,786 B2 | 3/2013 | Hodges et al. |
| 8,429,407 B2 | 4/2013 | Os et al. |
| 8,458,363 B2 | 6/2013 | Rosenblatt et al. |
| 2004/0003133 A1 | 1/2004 | Pradhan et al. |
| 2008/0195735 A1 | 8/2008 | Hodges et al. |
| 2010/0199092 A1 | 8/2010 | Andrus et al. |
| 2011/0070829 A1* | 3/2011 | Griffin ................ H04B 5/02 455/41.1 |
| 2011/0187652 A1 | 8/2011 | Huibers |
| 2012/0306643 A1 | 12/2012 | Dugan |
| 2014/0070957 A1 | 3/2014 | Longinotti-Buitoni et al. |
| 2014/0120834 A1* | 5/2014 | Gormley ............. H04B 5/0012 455/41.1 |
| 2014/0149514 A1 | 5/2014 | Ryan et al. |
| 2014/0365979 A1* | 12/2014 | Yoon ..................... G06F 3/017 715/863 |

OTHER PUBLICATIONS

International Search Report and Written Opinion dated Sep. 18, 2014 in International Application No. PCT/US2013/076063. 12 pages.

* cited by examiner

GESTURE-BASED INFORMATION EXCHANGE BETWEEN DEVICES IN PROXIMITY

CROSS-REFERENCES TO RELATED APPLICATIONS

This application is the U.S. National Phase of PCT Application No. PCT/US2013/076063, filed Dec. 18, 2013, the disclosure of which is incorporated herein by reference in its entirety.

BACKGROUND

The present disclosure relates generally to wearable electronic devices and in particular to exchanging information (including but not limited to contact information) between wearable electronic devices that are in proximity to each other.

Mobile electronic devices, such as mobile phones, smart phones, tablet computers, media players, and the like, have become quite popular. Many users carry a device almost everywhere they go and use their devices for a variety of purposes, including making and receiving phone calls, sending and receiving text messages and emails, navigation (e.g., using maps and/or a GPS receiver), purchasing items in stores (e.g., using contactless payment systems), and/or accessing the Internet (e.g., to look up information). A mobile device is typically personal to the user who carries it and can store personal information about that user.

SUMMARY

Certain embodiments of the present invention can facilitate the exchange of information (including but not limited to contact information) between user devices (e.g., mobile devices) worn or carried by two different users. The exchange of information can be wholly or partially automated and can occur in response to a device detecting a "greeting event." In some embodiments, a greeting event is defected when two user devices belonging to different users are in proximity and the users of the devices concurrently execute a greeting gesture, such as a handshake, bow, hand slap, hug, or the like.

In response to detecting a greeting event, a "sending" device (which can be either or both of the user devices) can select particular information items (including in some instances no information items) to be sent based on contextual information available to the sending device. In various embodiments, contextual information can include information about the sending device (e.g., current location, access to particular networks or other resources); information about the user of the sending device (e.g., the user's current scheduled or actual activity); information about the "receiving" device to which the information is to be sent (e.g., device identifier, device type, identity of the user of the receiving device, record of previous interactions with the receiving device); and or other information that may be available to the sending device. It is to be understood that in response to a single greeting event, each participating user device can act as both sender and receiver, selecting and sending information items to the other user device and receiving any information items that the other user device selects to send. Accordingly, users can control and customize what information their devices send in a context-specific manner; this can allow users to manage and control the sharing of personal data and or other information items according to their preferences while still allowing the exchange to occur automatically (without being expressly initiated by the user).

In some embodiments, sharing of information items in response to a greeting event can be further managed by the user after the fact. For instance, a sending device can generate a cryptographic key and can use the key to encrypt any or all of the information items that it sends to the receiving device in response to a greeting event. The sending device can communicate the key and an identifier of the receiving device to a server that is accessible to the users of both user devices. At a later time, the users of both devices can access the server (independently of each other) and indicate whether they want to exchange information. If both users agree to the exchange, the server can send the appropriate keys to the receiving parties, allowing the received data to be decrypted and accessed.

In some embodiments, in response to detecting a greeting event, a user device can generate or update a content item that documents or announces the event, e.g., a microblog post or status update on a social network, a journal entry for the user's journal, etc. For instance, if the wearable device receives contact information for another user in response to the greeting event, the wearable device can generate a content item indicating that the wearable device's user is currently with the other user; the content item can include other information, such as where the users are. The content item can be posted to a social network, recorded in a journal, or stored or distributed elsewhere; depending on implementation such posting, recording, or storing can be made contingent on express user approval of the content item.

The following detailed description together with the accompanying drawings will provide a better understanding of the nature and advantage, or the present invention.

DETAILED DESCRIPTION

Figure 1:
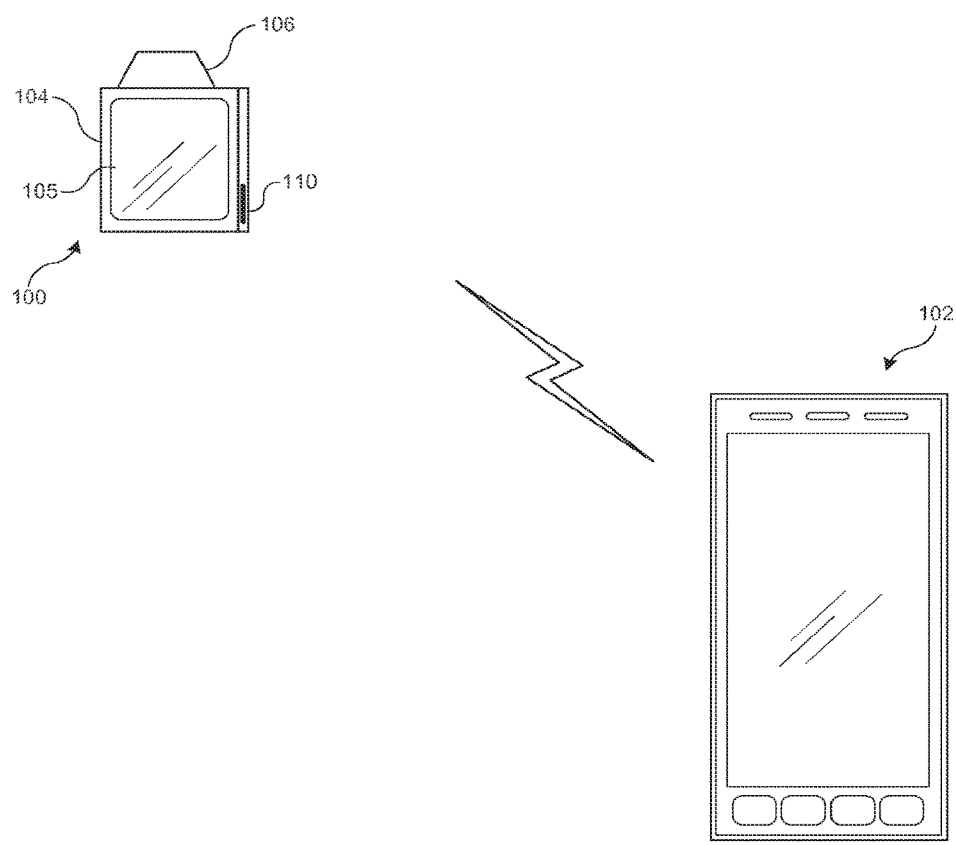
FIG. 1 shows a wearable device communicating wirelessly with a mobile device according to an embodiment of the present invention.

Certain embodiments of the present invention can facilitate the exchange of information (including but not limited to contact information) between user devices worn or carried by two different users. The exchange of information can be wholly or partially automated and can occur in response to a device detecting a "greeting event." In some embodiments, a greeting event is detected when two user devices belonging to or otherwise associated with different users are in proximity and the users of the devices concurrently execute a greeting gesture (e.g., handshake, bow, hand slap, hug, or the like).

In response to detecting a greeting event, a "sending" device (which can be either or both of the user devices) can select particular information items (including in some instances no information) to be sent based on contextual information available to the sending device. In various embodiments, contextual information can include information about the sending device (e.g., current location, access to particular networks or other resources); about the user (e.g., user's current activity); about the "receiving" device to which the information is to be sent (e.g., device identifier, device type, identity of the user of the receiving device, previous interactions with the receiving device); and or other information that may be available to the sending device. It is to be understood that in response to a single greeting event, each participating user device can act as both sender and receiver, selecting and sending information items to the other user device and receiving any information items that the other user device selects to send. Accordingly, users can control and customize what information their devices send in a context-specific manner; this can allow users to manage and control the sharing of personal data and/or other information items according to their preferences while still allowing the exchange to occur automatically (without being expressly initiated by the user).

In some embodiments, sharing of information in response to a greeting event can be further managed by the user after the fact. For instance, a sending device can generate a cryptographic key and can use the key to encrypt any or ail of the data that it sends to the receiving device in response to a greeting event. The key can be specific to the receiving device or to the greeting event, such that the same key is not usable to decrypt data sent to other devices. The sending device can communicate the key and an identifier of the receiving device to a server that is accessible to the users of both user devices. At a later time, the users of both devices can access the server (independently of each other) and indicate whether they want to exchange information. If both users agree to the exchange, the server can send the appropriate keys to the receiving parties, allowing the received data to be decrypted and accessed.

In some embodiments, in response to detecting a greeting event, a user device can generate or update a content item that documents or announces the event, e.g., a microblog post or status update on a social network, a journal entry for the user's journal, etc. For instance, if the wearable device receives contact information for another user in response to the greeting event, the wearable device can generate a content item indicating that the wearable device's user is currently with the other user; the content item can include other information, such as where the users are. The content item can be posted to a social network, recorded in a journal, or stored or distributed elsewhere; depending on implementation such posting, recording, or storing can be made contingent on express user approval of the content item.

User devices can include any device that a user can wear on her person or carry with her during daily activities. Examples include wearable devices that users can attach to their person or clothing. For example, a wearable device can be designed as a watch, a ring, a bracelet, a necklace, or any other jewelry item; an item of eyewear (e.g., eyeglasses); a headband; a belt, a shoe, a scarf, a vest, or any other article of clothing; and so on. In some instances, a wearable device can have a clip, clasp, or other attachment structure that facilitates attachment of the device to the users clothing.

In some embodiments, user devices can include mobile devices that, while not necessarily wearable, can interact with wearable devices to perform operations described herein. FIG. 1 shows a wearable device 100 communicating wirelessly with a mobile device 102 according to an embodiment of the present invention. In this example, wearable device 100 is shown as having a face portion 104 and an attachment member 106.

Face portion 104 can include, e.g., a touchscreen display 105 that can be appropriately sized depending on where on a user's person wearable device 100 is intended to be worn. A user can view information presented by wearable device 100 on touchscreen display 105 and provide input to wearable device 100 by touching touchscreen display 105. In some embodiments, touchscreen display 105 can occupy most or all of the front surface of face portion 104. Attachment member 106 can be used to secure wearable device 100 to the user's person or clothing. Depending on implementation, attachment member 106 can include a strap (e.g., a watchband, armband, headband, belt or the like), a clip, a clasp, a clamp, a loop of rigid or flexible material through which a strap or chain can be inserted, and so on. In some embodiment, wearable device 100 can be implemented as a wristwatch-like device, and attachment member 106 can include a watchband, which might or might not include active electronic components such as sensors, logic circuits, battery, solar panels, or the like. A variety of form factory and implementations can be used, provided that wearable device 100 can detect greeting events (examples of which are described below). In some embodiments, attachment member 106 and/or face portion 104 can include sensors that allow wearable device 100 to detect whether it is currently being worn, and wearable device 100 can automatically enter a low-power state when not being worn.

Mobile device 102 can be any device that communicates with wearable device 100 and that a user might carry from place to place and use in different places. For example, mobile device 102 can be a handheld device that is designed to be held in a user's hand during active use and stowed somewhere (e.g., in a pocket or bag) when not in use. In FIG. 1, mobile device 102 is shown as a smart phone; however, other devices can be substituted, such as a tablet computer, a media player, any type of mobile phone or other handheld computing and/or communication device, a laptop computer, or the like.

In some embodiments, wearable device 100 can also communicate with other host devices that are not necessarily mobile, such as desktop computer systems, point-of-sale terminals, security systems, environmental control systems, and so on. Mobile device 102 (and any other host devices) can communicate wirelessly with wearable device 100, e.g., using protocols such as Bluetooth or Wi-Fi. In some embodiments, wearable device 100 can include an electrical connector 110 that can be used to provide a wired connection to mobile device 102 and/or to other devices, e.g., by using suitable cables. For example, connector 110 can be used to connect to a power supply to charge an onboard battery of wearable device 100.

In some embodiments, wearable device 100 and mobile device 102 can interoperate to enhance functionality available on mobile device 102. For example, wearable device 100 and mobile device 102 can establish a pairing using a wireless communication technology such as Bluetooth. While the devices are paired, mobile device 102 can send notifications of selected events (e.g., receiving a phone call, text message, email message, or other information) to wearable device 100, and wearable device 100 can present corresponding alerts to the user. Wearable device 100 can also provide an input interface via which a user can respond to an alert (e.g., to answer a phone call, reply to a text message, or access other information). In some embodiments, wearable device 100 can also provide a user interface that allows a user to initiate an action on mobile device 102, such as unlocking mobile device 102 or turning on its display screen, placing a phone call, sending a text message, or controlling media playback operations of mobile device 102.

In examples described herein, wearable device 100 and mobile device 102 can be "user" devices that are exclusively or primarily used by one individual. Alternatively, the devices can be shared among multiple users; however, at any given time, it is assumed that one user is exercising exclusive control over the device, and the device can be described as belonging to the user who has control.

Mobile device 102 and wearable device 100 can be two different devices that belong to the same user and interoperate to facilitate various tasks the user might wish to do. In some embodiments, wearable device 100 can communicate with devices other than mobile device 102, including user devices that belong to other users. For example, when wearable device 100 detects another user device in close proximity, wearable device 100 can exchange information with that device. In some embodiments, wearable device 100 can determine what (if any) information should be provided to each other user device it detects, without requiring express user input to initiate the information exchange. For example, wearable device 100 can detect whether the user has performed a greeting gesture (examples of which are described below) while another user device is in proximity, and wearable device 100 can communicate with the other user device to determine whether the other user device also detected a greeting gesture. The mutual detection of greeting gestures can trigger exchange of other information. Any type of information can be exchanged, including user contact information, other personal information, photos, audio files, video files, data files, and so on.

It will be appreciated that wearable device 100 and mobile device 102 are illustrative and that variations and modifications are possible. For example, wearable device 100 can be implemented in a variety of wearable articles. In some embodiments, wearable device 100 can be operative regardless of whether mobile device 102 is in communication with wearable device 100.

Figure 2:
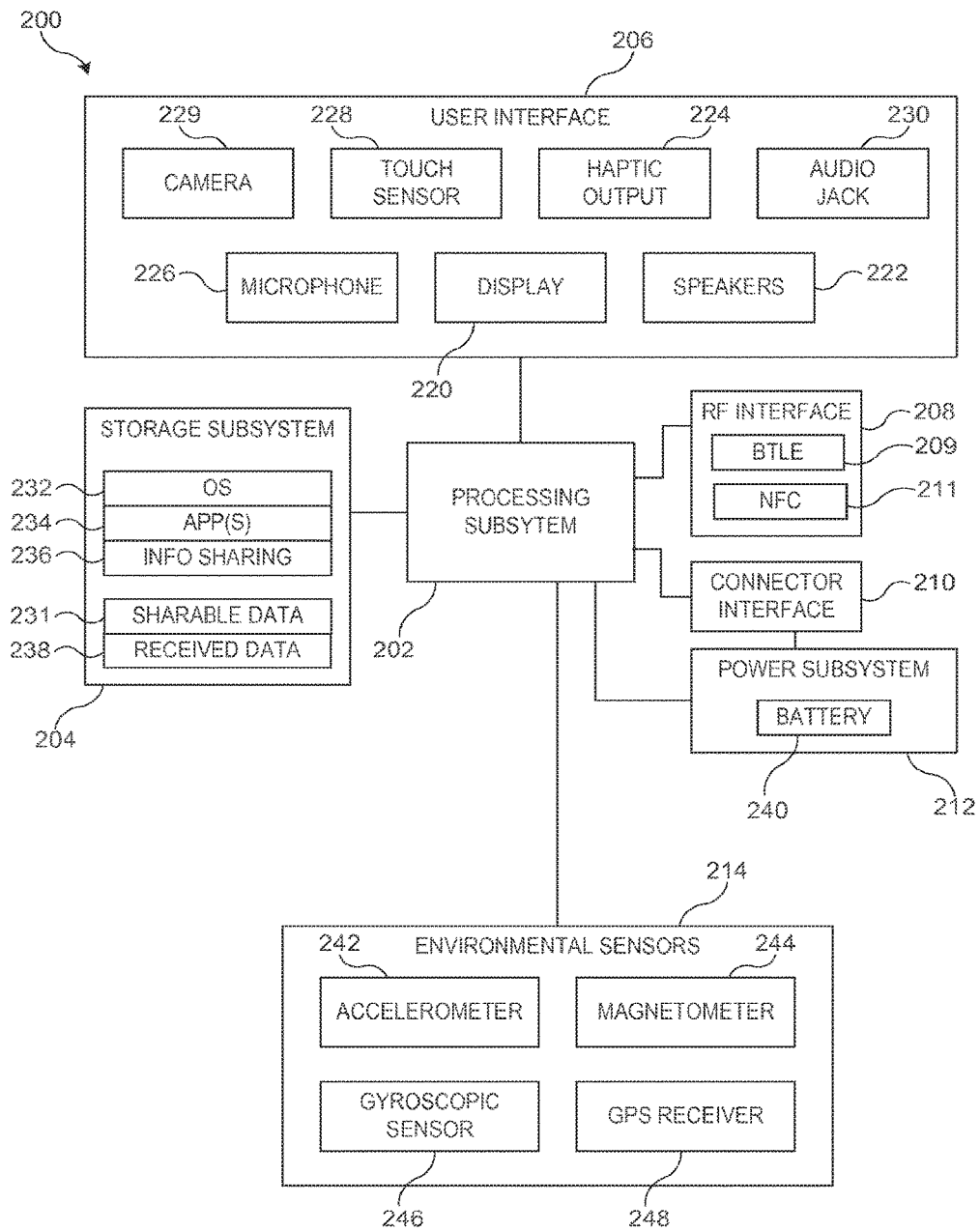
FIG. 2 is a simplified block diagram of a wearable device according to an embodiment of the present invention.

Wearable device 100 can be implemented using electronic components disposed within face portion 104 and/or strap 106. FIG. 2 is a simplified block diagram of a wearable device 200 (e.g., implementing wearable device 100) according to an embodiment of the present invention. Wearable device 200 can include processing subsystem 202, storage subsystem 204, user interface 206, RF interface 208, connector interface 210, power subsystem 212, and environmental sensors 214. Wearable device 200 can also include other components (not explicitly shown).

Storage subsystem 204 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 204 can store media items such as audio files, video files, image or artwork files; contact information for a user to whom wearable device 200 belongs; information about the user's contacts (names, addresses, phone numbers, etc.); information about a user's scheduled appointments and events; notes; and/or other types of information. In some embodiments, storage subsystem 204 can also store one or more application programs (or apps) 234 to be executed by processing subsystem 202 (e.g., video game programs, personal information management programs, media playback programs, interface programs associated with particular host devices and/or host device functionalities, etc.).

In some embodiments, storage subsystem 204 can store one or more sharable data objects 231 that can be selectively shared by wearable device 200; examples of selective sharing of data objects are described below. In various embodiments, sharable data objects 231 can include contact information for the user (e.g., any or all of a name, an email address, a phone number, a street address, a postal address, a user name for a social network account of the user, etc.), media files (e.g., images, audio, video), formatted or unformatted text documents, uniform resource locators (URLs) or other links or references to a location from which information can be retrieved, and/or any other type of data object.

User interface 206 can include any combination of input and output devices. A user can operate input devices of user interface 206 to invoke the functionality of wearable device 200 and can view, hear, and/or otherwise experience output from wearable device 200 via output devices of user interface 206.

Examples of output devices include display 220, speakers 222, and haptic output generator 224. Display 220 can be implemented using compact display technologies, e.g., LCD (liquid crystal display), LED (light-emitting diode), OLED (organic light-emitting diode), or the like. In some embodiments, display 220 can incorporate a flexible display element or curved-glass display element, allowing wearable device 200 to conform to a desired shape. One or more speakers 222 can be provided using small-form-factor speaker technologies, including any technology capable of convening electronic signals into audible sound waves. In some embodiments, speakers 222 can be used to produce tones (e.g., beeping or ringing) and can but need not be capable of reproducing sounds such as speech or music with any particular degree of fidelity. Haptic output generator 224 can be, e.g., a device that converts electronic signals into vibrations; in some embodiments, the vibrations can be strong enough to be felt by a user wearing wearable device 200 but not so strong as to produce distinct sounds.

Examples of input devices include microphone 226, touch sensor 228, and camera 229. Microphone 226 can include any device that converts sound waves into electronic signals. In some embodiments, microphone 226 can be sufficiently sensitive to provide a representation of specific words spoken by a user; in other embodiment microphone 226 can be usable to provide indications of general ambient sound levels without necessarily providing a high-quality electronic representation of specific sounds.

Touch sensor 228 can include, e.g., a capacitive sensor array with the ability to localize contacts to a particular point or region on the surface of the sensor and in some instances, the ability to distinguish multiple simultaneous contacts. In some embodiments, touch sensor 228 can be combined with display 220 to provide a touchscreen interface (e.g., touchscreen interface 105 of FIG. 1), and processing subsystem 202 can translate touch events (including taps and/or other gestures made with one or more contacts) into specific user inputs depending on what is currently displayed on display 220.

Camera 229 can include, e.g., a compact digital camera that includes an image sensor such as a CMOS sensor and optical components (e.g. lenses) arranged to focus an image onto the image sensor, along with control logic operable to use the imaging components to capture and store still and/or video images, images can be stored, e.g., in storage subsystem 204 and/or transmitted by wearable device 200 to other devices for storage. Depending on implementation, the optical components can provide fixed focal distance or variably focal distance; in the latter case, autofocus can be provided. In some embodiments, camera 229 can be displaced along an edge of face member 104 of FIG. 1, e.g., the top edge, and oriented to allow a user to capture images of nearby objects in the environment such as a bar code or QR code. In other embodiments, camera 229 can be disposed on the front surface of face member 104, e.g., to capture images of the user. Zero, one, or more cameras can be provided, depending on implementation.

In some embodiments, user interface 206 can provide output to and/or receive input from an auxiliary device such as a headset. For example, audio jack 230 can connect via an audio cable (e.g., a standard 2.5-mm or 3.5-mm audio cable) to an auxiliary device. Audio jack 230 can include input and or output paths. Accordingly, audio jack 230 can provide audio to the auxiliary device and/or receive audio from the auxiliary device. In some embodiments, a wireless connection interface can be used to communicate with an auxiliary device.

Processing subsystem 202 can be implemented as one or more integrated circuit, e.g., one or more single-core or multi-core microprocessors or microcontrollers, examples of which are known in the art. In operation, processing system 202 can control the operation of wearable device 200. In various embodiments, processing subsystem 202 can execute a variety of programs in response to program code and can maintain multiple concurrently executing programs or processes. At any given time, some or all of the program code to be executed can be resident in processing subsystem 202 and or in storage media such as storage subsystem 204.

Through suitable programming, processing subsystem 202 can provide various functionality for wearable device 200. For example, in some embodiment, processing subsystem 202 can execute an operating system (OS) 232 and various applications 234 such as a phone-interface application, a text-message-interface application, a media interface application, a fitness application, and/or other applications. In some embodiments, some or all of these application programs can interact with a host device (e.g., mobile device 102 of FIG. 1), e.g., by generating messages to be sent to the host device and/or by receiving and interpreting messages from the host device. In some embodiments, some or all of the application programs can operate locally to wearable device 200. For example, if wearable device 200 has a focal media library stored in storage subsystem 204, a media interface application can provide a user interface to select and play locally stored media items.

Processing subsystem 202 can also execute information sharing code 236 (which can be part of OS 232 or separate as desired). In some embodiments, execution of information sharing code 236 can cause wearable device 200 to detect the presence of other nearby devices (e.g., using RF interface 208) and to analyze various information including sensor data and/or other context data in order to determine whether and what information to share with a detected nearby device. For example, execution of information sharing code 236 can cause processing subsystem 202 to select one or more sharable data objects 231 and send the selected sharable data objects 231 to the detected nearby device. In some embodiments, execution of information sharing code 236 can also cause wearable device 200 to accept information (including sharable data objects from the detected nearby device. Wearable device 200 can store such information, e.g., as received data object 238 in storage subsystem 204, for later presentation to the user. Examples of specific processes that can be implemented using information sharing code 236 are described below.

RF (radio frequency) interface 208 can allow wearable device 200 so communicate wirelessly with various host devices (e.g., mobile device 100 of FIG. 1) and/or with other user devices, including devices belonging to other users. RF interface 208 can include RF transceiver components such as an antenna and supporting circuitry to enable data communication over a wireless medium, e.g., using Wi-Fi (IEEE 802.11 family standards), Bluetooth® (a family of standards promulgated by ANT Bluetooth SIG, Inc.). ANT/ANT+ (open access sensor network protocols promulgated by ANT Wireless and the ANT+ Alliance), or other protocols for wireless data communication. In some embodiments, RF interface 208 can implement a Bluetooth LE (Low energy) proximity sensor 209 that supports proximity detection through an estimation of signal strength and/or other protocols for determining proximity to another electronic device. In some embodiments, RF interface 208 can provide a near-field communication ("NFC") interface 211, e.g., implementing the ISO/IEC 18092 standards or the like. NFC interface 211 can support wireless data exchange between devices over a very short range (e.g., 20 centimeters or less), and in some embodiments can be used for proximity detection. RF interface 208 can be implemented using a combination of hardware (e.g., drive circuits, antennas, modulators/demodulators, encoders/decoders, and other analog and/or digital signal processing circuits) and software components. Multiple different wireless communication protocols and associated hardware can be incorporated into RF interface 208.

Connector interface 210 can allow wearable device 200 to communicate with various host devices via a wired communication path, e.g., using Universal Serial Bus (USB), universal asynchronous receiver/transmitter (UART), or other protocols for wired data communication. In some embodiments, connector interface 210 can provide a power port, allowing wearable device 200 to receive power, e.g., to charge an internal battery 240. For example, connector interface 210 can include a connector such as a mini-USB connector or a custom connector, as well as supporting circuitry.

In some embodiments, connector interface 210 and/or RF interface 208 can be used to support synchronization operations in which data is transferred from a host device (e.g., mobile device 102 of FIG. 1) to wearable device 200 (or vice versa). For example, a user may be able to customize settings and other information for wearable device 200, such as defining sharable data objects 231 and/or conditions (contexts) under which specific data objects 231 should be shared. While user interface 206 can support data-entry operations, a user may find it more convenient to define customized information on a separate device (e.g., a tablet or smartphone) that has a larger interface (e.g., including a real or virtual alphanumeric keyboard), then transfer the customized information to wearable device 200 via a synchronization operation. Synchronization operations can also be used to load and/or update other types of data in storage subsystem 204, such as media items, application programs, personal data, and/or operating system programs. Synchronization operations can also be used to transfer (move or copy) received data objects 238 from storage subsystem 204 to a host device. Synchronization operations can be performed in response to an explicit user request and/or automatically, e.g., when wireless device 200 resumes communication with a particular host device or in response to either device receiving an update to its copy of synchronized information.

Environmental sensors 214 can include various electronic, mechanical, electromechanical, optical, or other devices that provide information related to external conditions around wearable device 200. Sensors 214 in some embodiments can provide digital signals to processing subsystem 202, e.g., on a streaming basis or in response to polling by processing subsystem 202 as desired. Any type and combination of environmental sensors can be used; shown by way of example are accelerometer 242, a magnetometer 244, a gyroscope 246, and a GPS receiver 248.

Some environmental sensors can provide information about the location and/or motion of wearable device 200. For example, accelerometer 242 can sense acceleration (relative to freefall) along one or more axes, e.g., using piezoelectric or other components in conjunction with associated electronics to produce a signal. Magnetometer 244 can sense an ambient magnetic field (e.g., Earth's magnetic field) and generate a corresponding electrical signal, which can be interpreted as a compass direction. Gyroscopic sensor 246 can sense rotational motion in one or more directions, e.g., using one or more MEMS (micro-electro-mechanical-systems) gyroscopes and related control and sensing circuitry. Global Positioning System (GPS) receiver 248 can determine location based on signals received from GPS satellites.

Other sensors can also be included in addition to or instead of these examples. For example, a sound sensor can incorporate microphone 226 together will associated circuitry and/or program code to determine, e.g., a decibel level of ambient sound. Temperature sensors, proximity sensors, ambient light sensors, or the like can also be included.

Power subsystem 212 can provide power and power management capabilities for wearable device 200. For example, power subsystem 212 can include battery 240 (e.g., a rechargeable battery) and associated circuitry to distribute power from battery 240 to other components of wearable device 200 that require electrical power, in some embodiments, power subsystem 212 can also include circuitry operable to charge battery 240, e.g., when connector interface 210 is connected to a power source. In some embodiments, power subsystem 212 can include a "wireless" charger, such as an inductive charger, to charge battery 240 without relying on connector interface 210. In some embodiments, power subsystem 212 can also include other power sources, such as a solar cell, in addition to or instead of battery 240. Power subsystem 212 can also provide other power management capabilities, such as regulating power consumption of other components of wearable device 200 based on the source and amount of available power and/or current user activity, monitoring stored power in battery 240, generating user alerts if the stored power drops below a minimum level, and so on.

In some embodiments, control functions of power subsystem 212 can be implemented using programmable or controllable circuits operating in response to control signals generated by processing subsystem 202 in response to program code executing thereon, or as a separate microprocessor or microcontroller.

It will be appreciated that wearable device 200 is illustrative and that variations and modifications are possible. For example, wearable device 200 can include a user-operable control (e.g., a button or switch) that the user can operate to provide input. Controls can also be provided, e.g., to turn on or off display 220, mute or unmute sounds from speakers 222, etc. Wearable device 200 can include any types and combination of sensors and in some instances can include multiple sensors of a given type.

In various embodiments, a user interface can include any combination of any or all of the components described above, as well as other components not expressly described. For example, in some embodiments, the user interface can include, e.g., just a touchscreen, or a touchscreen and a speaker, or a touchscreen and a haptic device. Where the wearable device has an RF interface, a connector interface can be omitted, and all communication between the wearable device and other devices can be conducted using wireless communication protocols. A wired power connection, e.g., for charging a battery of the wearable device, can be provided separately from any data connection, or inductive (wireless) charging can be used.

Further, while the wearable device is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software. It is also not required that every block in FIG. 2 be implemented in a given embodiment of a wearable device.

A mobile device such as mobile device 102 of FIG. 1 can be implemented as an electronic device using blocks similar to those described above (e.g., processors, storage media, user interface devices, data communication interfaces, etc.) and/or other blocks or components.

Communication between a mobile device and a wearable device can be implemented according to any communication protocol (or combination of protocols) that both devices are programmed or otherwise configured to use. In some instances, standard protocols such as Bluetooth protocols can be used. In some instances, a custom message format and syntax (including, e.g., a set of rules for interpreting particular bytes or sequences of bytes in a digital data transmission) can be defined, and messages can be transmitted using standard serial protocols such as a virtual serial port defined in certain Bluetooth standards. Embodiments of the invention are not limited to particular protocols, and those skilled in the art with access to the present teachings will recognize that numerous protocols can be used.

Figure 3:
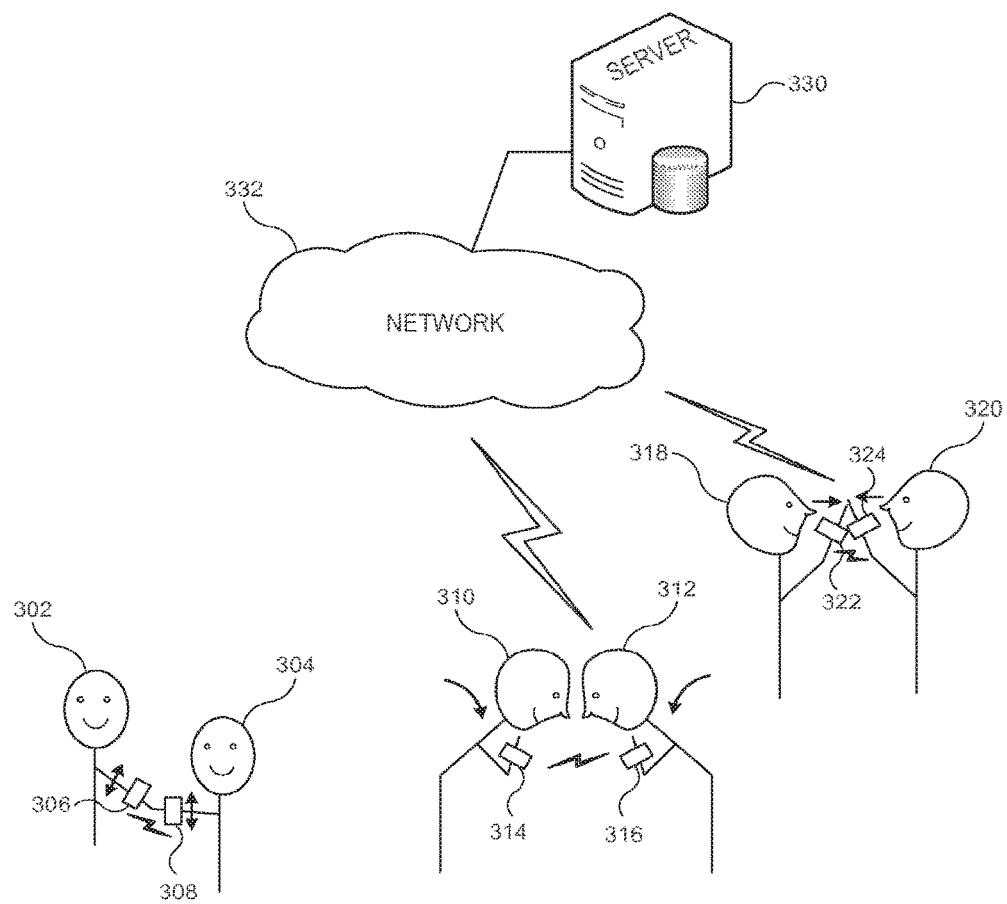
FIG. 3 shows examples of wearable user devices communicating directly with each other while in proximity according to an embodiment of the present invention.

In accordance with certain embodiments of the present invention, user devices belonging to different users can also communicate directly with each other, e.g., to exchange sharable data objects. FIG. 3 shows examples of wearable user devices communicating directly with each other while in proximity according to an embodiment of the present invention. In these examples, two users, each wearing a wearable device, are performing various greeting gestures. Each of the wearable devices can be implemented similarly to device 200 of FIG. 2 or device 100 of FIG. 1, and devices implemented differently can interact with each other as long as communication between them is possible. Based on a combination of the greeting gesture and proximity to another device, each wearable device can detect a "greeting event," and detection of a greeting event can trigger the devices to exchange information.

For instance, user 302 and user 304 are shown shaking hands, a common form of greeting. User 302 is wearing a wearable device 306, and user 304 is wearing a wearable device 308. The act of shaking hands can bring wearable devices 306 and 308 into proximity and can also subject wearable devices 306 and 308 to acceleration (e.g., a small up-and-down motion of a kind normally associated with shaking hands, as indicated by the arrows). Each of wearable devices 306 and 308 can detect its proximity to the other (e.g., using Bluetooth LE or NFC-based proximity sensors), and each can detect the acceleration it experiences (e.g., using internal accelerometers). Further, each of wearable devices 306 and 308 can communicate with the other (e.g., using Bluetooth, NFC, Wi-Fi, or other wireless communication channels) to verify that the other device experienced similar acceleration. Thus, each of wearable devices 306 and 308 can detect a greeting event based on a combination of proximity to the other device and the experience of similar accelerations. Based on detecting the greeting event, wearable devices 306 and 308 can exchange sharable data objects such as user contact information and/or other sharable data objects as described above with reference to FIG. 2.

Another example of a greeting gesture is shown by users 310 and 312, who are bowing to each other, another common form of greeting. User 310 is wearing a wearable device 314, and user 312 is wearing a wearable device 316. The act of bowing can bring wearable devices 314 and 316 into proximity (in this example, not as close as shaking hands) and also subjects wearable devices 314 and 316 to acceleration (e.g., a downward movement and then back up as indicated by the arrows, generally performed at a deliberate speed). Each of wearable devices 314 and 316 can detect its proximity to the other (e.g., using Bluetooth LE proximity sensors), and each can detect the acceleration it experiences (e.g., using internal accelerometers). Further, each of wearable devices 314 and 316 can communicate with the other (e.g., using Bluetooth, Wi-Fi, or other wireless communication channels) to verify that the other device experienced similar acceleration. Thus, each of wearable devices 314 end 316 can detect a greeting event based on a combination of proximity to the other device and the experience of similar accelerations. Based on detecting the greeting event, wearable devices 314 and 316 can exchange sharable data objects such as user contact information and/or other sharable data objects as described above with reference to FIG. 2.

A third example of a greeting gesture is shown by users 318 and 320, who are exchanging a "high five" (or hand slap), a casual form of greeting or celebration in some parts of the world. User 318 is wearing a wearable device 322, and user 320 is wearing a wearable device 324. The act of slapping hands together can bring wearable devices 322 and 324 into proximity (comparable to shaking hands, and in some instances closer) and can also subject wearable devices 322 and 324 to acceleration (e.g., a motion away from the user, as indicated by the arrows, that can be interrupted or terminated by impact with the other user's hand). Each of wearable devices 322 and 324 can detect its proximity to the other (e.g., using Bluetooth LE or NFC-based proximity sensors), and each can detect the acceleration it experiences (e.g., using internal accelerometers). Further, each of wearable devices 322 and 324 can communicate with the other (e.g., using Bluetooth, NFC, Wi-Fi, or other wireless communication channels) to verify that the other device experienced similar acceleration. Thus, each of wearable devices 322 and 324 can detect a greeting event based on a combination of proximity to the other device and the experience of similar accelerations. Based on detecting the greeting event, wearable devices 322 and 324 can exchange sharable data objects such as user contact information and/or other sharable data objects as described above with reference to FIG. 2.

The greeting gestures shown in FIG. 3 are intended to be illustrative and not limiting. A greeting gesture can include any gesture that brings two users' wearable devices into proximity and that incorporates a distinctive acceleration or movement of the wearable device. Gestures can include users making contact with each other (e.g., shaking hands, slapping hands, bumping fists, hugging while patting the other person's back) or not (e.g., bowing, waving, saluting). The distinctive acceleration or movement can be defined so as to be reliably detected and recognized as a deliberate greeting gesture, and incorporating gesture recognition as well as proximity constraints can help reduce false positives where devices may incidentally come into proximity, such as when users are moving through a crowd or standing next to one another in a public space.

Further, although the term "greeting" is used herein to refer to various gestures and events that can trigger exchanges of selected data objects, it is to be understood that the gesture need not actually be performed, at the beginning of an encounter (when two people would typically greet each other) but can be performed at any time when the users' wearable devices are in proximity to each other. Thus, for example, the users can first meet and agree to exchange information with each other, then perform a greeting gesture to trigger the exchange. In other embodiments, detection of a greeting event can be based entirely on proximity (e.g., very close proximity, such as a few centimeters or actual contact, maintained for a sufficient period of time to indicate that the proximity is deliberate), and performance of a specific gesture need not be required.

The gestures can include handshakes, bows, and high-fives or hand slaps as shown, or any other gesture that produces a distinctive acceleration and that can be performed while devices are in proximity. Limiting the detection of greeting events to devices in proximity can avoid false positives when attempting to detect greeting events in an area where many wearable devices may be within communication range. In some embodiments, the greeting gestures can include "natural" gestures that are similar or identical to greeting gestures a user might naturally (depending on his or her culture) perform when encountering someone. In some embodiments, the greeting gestures can include gestures, that are "artificial," i.e., specially defined for purposes of triggering data exchange. For instance, many users would wear a wrist device on their left wrist but shake hands with their right hand. To facilitate detection of a handshake as a greeting event, such users might add their left hand to the handshake (e.g., placing their left hands on their clasped right hands) when they wants to share data objects with each other. Or the users could agree to perform a left-handed shake.

In some embodiments, the same user (e.g., user 302) can perform different greeting gestures at different times, e.g., shaking with a boss, bowing to a customer, high-fiving a friend. A wearable device (e.g., wearable device 306) can be configured to recognize any number of different greeting gestures and to identify which greeting gesture was performed on a particular occasion. As described below, different greeting gestures can trigger sharing of different sharable data objects.

It should be noted that exchange of shared data objects can occur automatically in response to detecting the greeting event. Thus, users need not expressly instruct their devices to initiate an exchange, nor do they need to expressly tell each other that they want to exchange information, although some implementations can provide these options.

Various scenarios can occur, using the same devices or different devices. For instance, if the device can recognize a natural greeting gesture, exchange of sharable data objects can automatically occur without any user action beyond the making of the gesture. In such instances, the user need not give thought to asking for or providing the information that is automatically exchanged. As another example, users may agree between themselves to exchange information and then perform the appropriate greeting gesture to trigger the exchange.

In addition, although the term "exchange" of sharable data objects is used above, it is to be understood that two-way exchange is not required. In some embodiments, selection of data objects to share with another device can be context-dependent (examples are described below), and it is possible that one device may send a data object to another without receiving a data object in return.

In some embodiments, all communication associated with exchange of sharable data objects can occur directly between two devices (e.g., between wearable devices 306 and 308). In some embodiments, some or all of the communication may include an intermediary such as server 330 that can manage various aspects of exchanging sharable data objects. Various wearable devices (e.g., wearable devices 314 and 316) can communicate with server 330, e.g., by connecting to a network 332 such as the Internet, local area network, or the like.

Further, as shown in FIG. 1, some or all wearable can also be paired with a host device (e.g., mobile device 102 or the like) belonging to the same user. Where this is the case, the paired host device can be used to communicate with server 330 and/or to perform other operations such as managing user preferences in relation to data objects to be shared and/or conditions under which sharing should occur. Further, in some embodiments, a paired host device can provide context information for use in determining whether data sharing with another user's device should occur. Examples are described below.

Figure 4:
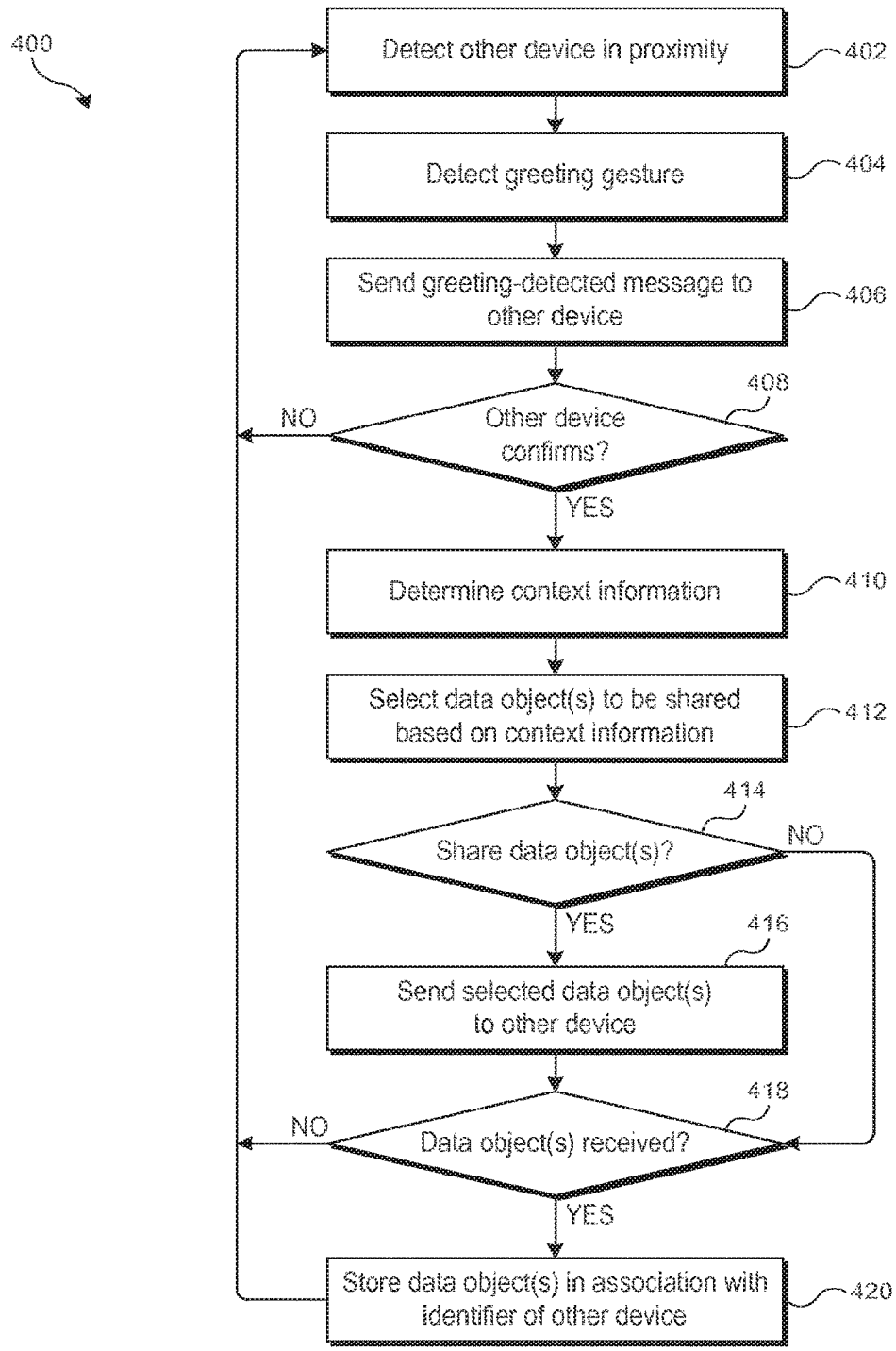
FIG. 4 is a flow diagram of a process for exchanging data objects in response to a greeting event according to an embodiment of the present invention.

When two users (e.g., users 302 and 304 in FIG. 3) perform a greeting gesture, their wearable devices (e.g., devices 306 and 308) can detect a greeting event and exchange one or more data objects in response to the greeting event. FIG. 4 is a flow diagram of a process 400 for exchanging data objects in response to a greeting event that can be performed by a user device (e.g., either or both of device 306 and 308) according so an embodiment of the present invention.

Process 400 can begin at block 402, where a user device belonging to one user (e.g., device 306) can detect that a user device belonging to a different user (e.g., device 308) is in proximity. For instance, an approximate distance between devices can be determined and compared to a threshold, with proximity being detected if the distance is less than the threshold. Any technique for determining an approximate distance between devices can be used, including techniques based on Bluetooth or Bluetooth LE signal strength, NFC response, and so on. In some embodiments, proximity detection can include a time constraint such that that proximity is only detected if the devices remain within the threshold distance for longer than some minimum time interval (e.g., 2 seconds, 5 seconds, 30 seconds). Applying a time constraint can help reduce false positives due to transient proximity of devices (e.g., walking past someone).

At block 404, while other device 308 is in proximity, wearable device 306 can detect a greeting gesture. For instance, accelerometer data or other motion-sensor data (e.g., provided by accelerometer 242 and/or other sensors 214 in the implementation of FIG. 2) can be matched to a known pattern of motion characteristic of a particular greeting gesture. Any of the gestures described above with reference to FIG. 3 or any other gesture or motion defined as indicative of a greeting gesture can be detected.

At block 406, wearable device 306 can send a "greeting-detected" message to other device 308. Any available communication protocol (e.g., Bluetooth, Bluetooth LE, Wi-Fi, NFC) can be used to send this message, provided that both devices use the same protocol so that a received message can be properly interpreted by the recipient. In some embodiments, the greeting-detected message can include a device identifier of the sender, allowing a recipient to confirm whether a received greeting-detected message originated from the device that was detected as being in proximity at block 402.

At block 408, wearable device 306 can determine if other device 308 has confirmed the greeting event. For example, other device 308 can also be executing process 400, and wearable device 306 can receive a "greeting-detected" message sent by device 308. Thus, the confirmation at block 408 need not be a response to or acknowledgement of a message sent at block 406, and the sending and receiving of "greeting-detected" messages between two devices can occur in any order.

If other device 308 fails to confirm the greeting event, then no data objects are to be exchanged, and process 400 can return to block 402 to attempt to detect another greeting event.

If, at block 408, other device 308 confirms the greeting event, then exchange of data objects can occur. In some embodiments, the same data object can be exchanged in response to each greeting event. In other embodiments, exchange of data objects can occur selectively, based on context information.

Accordingly, at block 410, wearable device 306 can determine context information pertaining to the contemplated exchange. "Context information" as used herein can include any data or information that can affect decisions as to which (if any) data objects a user device (e.g., wearable device 306) should exchange with a specific other user device (e.g., wearable device 308). Examples of context information can include the device's current location (e.g., determined using GPS, detected Wi-Fi networks, or other techniques); whether wearable device 306 has previously interacted with a particular other device 308 (and if so, how many times and/or how recently); a known relationship (e.g., a social-network connection) between the users of wearable device 306 and other device 308; the type of greeting gesture detected at block 404 (e.g., handshake versus high-five); information indicative of what the user is currently doing (e.g., calendar data, data from a physical activity monitor); presence or absence of specific "reference" devices in the vicinity, where a reference device can be any device other than the user devices that detected the greeting event; and so on.

At block 412, wearable device 306 can select zero or more data objects to be shared with wearable device 308 based on the context information determined at block 410. For instance, wearable device 306 can implement a set of decision rules to select data objects based on one or more items of context information. In some embodiments, the decision rules can be defined using a decision tree, lookup table, or other structure or algorithm that matches a particular combination of one or more items of context information to a set of zero or more data objects to be shared when that combination of items of context information occurs.

Blocks 410 and 412 can provide context-dependent selection of information to be shared in response to a greeting event. For example, in some embodiments, at block 410 wearable device 306 can determine (e.g., based on location information and/or calendar information) whether the user is currently at a work-related gathering or a non-work-related gathering. If the user is at a work-related gathering, wearable device 306 can select a work-related data object (e.g., a data object containing the user's work email address and/or work phone number). If the user is at a non-work-related gathering, wearable device 306 can select a different data object (e.g., a data object containing an email address that the user uses for non-work-related communications). Additional examples are described below.

At block 414, wearable device 306 can determine whether at least one data object has been selected to be shared. If so, then at block 416, the selected data object(s) can be sent to other device 308. As at block 406, any available communication protocol can be used, provided that both devices use the same protocol so that a received data object can be recognized and correctly interpreted by the recipient.

Regardless of whether wearable device 306 sends any data objects at block 416, wearable device 306 can receive (block 418) one or more data objects from other device 308. Like wearable device 306, other device 308 can also be executing process 400 and can determine whether to send any data objects to wearable device 406; in such instances, any data objects that other device 308 selected and sent can be received by wearable device 306 at block 418. It should be noted that devices 306 and 308 can independently select data objects to be sent and can apply different selection rides, accordingly, there need not be (although there can be) any correlation between the data objects that are sent and the data objects that are received. At block 420, any data objects that are received can be stored (e.g., as received data objects 238 in the implementation shown in FIG. 2). The received data objects can be stored in association with an identifier of the device that sent them and/or an identifier of the user of that device. In some embodiments, the stored identifier can facilitate associating data objects received from the same device (or same user) at different times with each other and/or with the user of the device that sent them. Received data objects can subsequently be presented to the user for review and/or further decisions (e.g., whether to add the information to the user's contact list or delete it).

Once data exchange is complete, process 400 can return to block 402 to attempt to detect another greeting event. Thus, process 400 can execute continuously (e.g., as a background process) while the user goes about her daily activities wearing wearable device 306. Whenever the user happens to greet someone with a compatible device (e.g., device 308), process 400 can automatically exchange information with that device, without express user instruction. In some embodiments, a user can enable or disable process 400. For example, the user can access a settings menu of device 306 that can include options to enable or disable detection of greeting events. As another example, process 400 can be implemented in an app that the user can launch or terminate at will. Execution of process 400 can also be paused or terminated automatically, e.g., if the RF interface of the device executing the process is powered down, or if a wearable device can determine that it is not currently being worn, and execution can resume if the condition that caused the pause or termination ceases to obtain.

It will be appreciated that process 400 is illustrative and that variations and modifications are possible. Steps described as sequential may be executed in parallel. Older of steps may be varied, and steps may be modified, combined, added or omitted. For instance, in some embodiments, a wearable device can continuously or periodically (e.g., every 1-100 milliseconds) monitor accelerometer data to detect a greeting gesture, and detection of a greeting gesture can be used as a trigger to turn on one or more RF components to detect nearby devices. Alternatively, both accelerometer and RF signals can be continuously or periodically monitored, and proximity and greeting gestures can be detected in any order. Further, in some embodiments, a greeting gesture is not required, and a greeting event can be detected based solely on proximity of two devices; in such cases, the proximity can be required to be very close (e.g., within 5 centimeters or 3 centimeters) and maintained for a long enough time (e.g., at least two seconds or more) that incidental proximity is unlikely. In some embodiments, one type of RF signal can be monitored to detect proximity, and detection of proximity can be used as a trigger to activate a different RF interface via which data is exchanged. For example, a Bluetooth LE signal can be used to detect proximity of another device, and an NFC interface can be activated in response to detecting proximity (with or without a greeting gesture); conversely, an NFC interface can be used to detect proximity of another NFC-enabled device, and a Bluetooth interface can be activated to perform data exchange in response to detecting proximity (again, with or without a greeting gesture).

Data objects can be defined as desired, and a single data object can contain any amount of information, depending on implementation. For example, in some embodiments, each item of information that might be shared (e.g., the user's name, each email address, each phone number) can be treated as a separate data object, the sending of each which can be separately controlled, and multiple data objects can be sent in response to one greeting event. In other embodiments, a single data object can bundle together multiple, potentially overlapping, information items; for instance, the user's name, work phone number, and work email address might be in one data object called "work contact" while the user's name (again), home phone number, and home email address might be in a different data object called "home contact." Where a data object contains a bundle of information items, a set of data objects can be defined such that no more than one data object would be sent in response to any particular greeting event.

Further, as described above, there need not be any correlation between the data objects that a device sends and the data objects that it receives in a particular interaction. However, some embodiments can include an exchange of correlated data objects, e.g., by allowing blocks 410-420 to be repeated in response to a single greeting event. For example, a device can examine a received data object to determine the type of data if contains and can send a corresponding data object in response, even if it has already sent other data objects. In one such scenario, a device might receive a data object combining user-contact information on a specific social network; in response, the device can send a data object containing its user's contact information on the same social network. As another example, two devices can negotiate a set of data objects to be exchanged; tor instance, each device can send an initial message indicating which information it intends to provide. Then, based on its own determination and the received message, the device can make a final determination as to which information to provide.

As described above, the information (or data objects) to be exchanged in a particular interaction between devices can be determined based on context information. This context information can include any information that can be used to infer what information the user would (or would not) want to share, given particular set of circumstances surrounding an encounter with another person. A set of decision rules can be applied to the context information to determine which data objects should be shared in response to a specific instance of detecting a greeting gesture.

For example, people who meet at a work related event typically exchange work contact information (e.g., name, work email address, work phone number, URL or other address of work-related website), while people who meet at non-work-related event typically exchange personal contact information (e.g., name, personal email address, home phone number, username or handle on a social media service). To the extent that the context information available to wearable device 306 supports a determination of the type of event the user is attending, wearable device 306 can select data objects that mirror these preferences. A type of event can be inferred from various information sources, including the user's calendar, location of the device, presence of other devices that the user's device can recognize (e.g., user devices belonging to work contacts or to non-work contacts), user input specifying the type of event, and soon.

Further, particularly in non-work-related social settings, people may prefer to provide minimal information to people they've only just met and more information as a relationship develops through repeated interactions. For example, upon meeting someone new, a person might be willing to provide contact information for a social network but not an email address or home phone number; them latter items of information might be reserved for those with whom the person has already had multiple interactions. Still other information, such as photos of the person's children, might be reserved for close friends or family or the like. To the extent that the context information available to wearable device 306 supports a determination of how much previous interaction the user has had with the user of other device 308, wearable device 306 can select data objects so as to gradually increase the amount of information available to the other user as more interactions occur.

In some embodiments, context-based decisions can be implemented using a decision tree model that can incorporate multiple decision dimensions in various combinations. Decision dimensions can include, for example, where the user is currently located, what event is taking place at that location, whether certain other users are present (e.g., whether signals from their devices can be detected), whether the other devices in the present greeting interaction has been in a previous greeting interaction, the type of greeting gesture performed, whether another relationship (e.g., connection on a social network) has been established between the users of the devices, etc.

Figure 5:
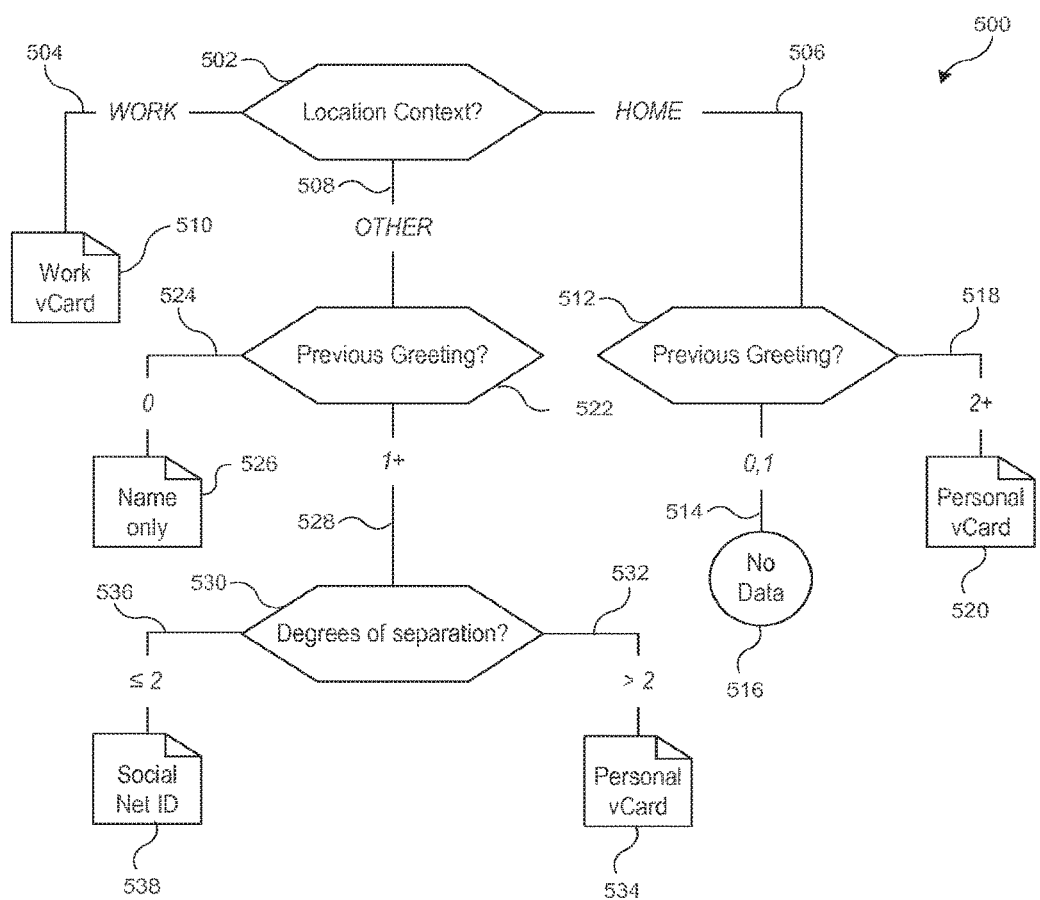
FIG. 5 shows a decision tree that can be used to select data objects to be shared according to an embodiment of the present invention.

FIG. 5 shows a decision tree 500 that can be used to select data objects to be shared (e.g., at block 412 of process 400 of FIG. 4) according to an embodiment of the present invention. At node 502, decision tree 500 can intrude a determination of a location context for the user. In this example, the location context can resolve to one of work-related locations (branch 504), home (branch 506), or any other location (branch 508).

Determining the location context can incorporate multiple items of context information, including geographic location and/or activity-related data. Geographic location can be determined, e.g., using GPS. In some embodiments, a user device such as wearable device 306 (or wearable device 200 or wearable device 100) can include a GPS receiver, or a user device that does not have a GPS receiver can be configured to obtain location data from a paired mobile device (e.g., device 102) that does have a GPS receiver. Geographic location can also be determined, e.g., by detecting the presence of one or more specific wireless network access points, cellular telephone transmitters, or the like that are known to be present at a particular geographic location. Activity-related data can be determined, e.g., based on calendar data maintained by the user, explicit user input (e.g., the user can indicate that she is attending a work-related event), or the like.

To determine a location context, the user device can combine geographic location with activity-related data. For instance, if the user is at the geographic location of her office, it can be inferred that "work" (branch 504) is the correct location context, and if the user is at the geographic location of her home, it can be inferred that "home" (branch 506) is the correct location context. If the user is at some other geographic location, activity data can be used to make an inference. For example, the user's calendar may indicate that she is scheduled to attend a professional conference on a particular date; accordingly, on that date it can be inferred that the user is in a "work" location context, even if the user is geographically remote from her office. In some instances, if the calendar data indicates the geographic location of the conference, the wearable device can use GPS or other geographic-location information to verify that the user is indeed at the conference. In some embodiments, geographic location can be overridden using activity data. For example, if the user's calendar indicates that she is hosting a party for clients at her home, the work context may be selected for the duration of the party, even if the user is geographically at home.

In some embodiments, rules can be defined to specify various conditions under which "work" branch 504 is selected and various other conditions under which "home" branch 506 is selected; if neither is selected, then "other" branch 508 can be selected.

This example assumes that the user is willing to distribute work-related contact information quite freely. Accordingly, in the work-related context (branch 504), any greeting event can trigger sharing of work-related information, in this case work vCard 510. As used herein, "vCard" refers to a generally known format for providing contact information and can include any or all of a person's name, a company name, a job title, a mailing address, a street address, an email address, a website address, a phone number, and so on; a work-related vCard can have fields populated with work-related information. Other formats and combinations of information items can be substituted, and use of vCards is not required.

This example further assumes that the user is more protective of personal (e.g., home) contact information. Accordingly, in the home context (branch 506), additional restrictions can be placed on the sharing of contact information. For instance, as shown, a further decision (node 512) can be based on how many previous greeting events involving the same other device have been detected. In some embodiments, decision node 512 can be implemented by configuring a user device (e.g., wearable device 200) to maintain a list of device identifiers of other devices with which it has previously detected and confirmed greeting events and, for each device identifier, a count of how many greeting events have been detected with that device. The count for a given device identifier can be incremented upon each greeting event, e.g., when decision block 408 in FIG. 4 returns an affirmative decision.

In this example, if zero or one previous greeting events have been detected (branch 514), then no data object is selected for sharing (node 516). If two (or more) previous greeting events have been detected (branch 518), then the user's personal vCard 520 can be shared. Personal vCard 520 can be similar to work vCard 510, except that fields can be populated with personal information, such as a personal email address, home phone number, home street address, etc.; other data formats and information items can be substituted.

"Other" branch 508 illustrates a use of additional contextual information, in this case information about the user of the other device. In this example, a further decision (node 522) can be based on how many previous greeting events with the other device have been detected, similarly to node 512; the same count of previous greeting events with other devices can be used without regard to location context, or a separate count can be maintained for different location contexts. In this case, if no previous greeting events with the other device have occurred (branch 524), the information shared can be limited, e.g., to just the user's name 526.

If one or more previous greeting events involving the other device have occurred (branch 528), then a further decision (node 530) can be based on whether the users of the two devices have some other established connection, e.g., within a particular social network. In this example, the social network can determine a degree of separation between two users (e.g., "first degree" if the two users have established a direct relationship such as being friends on Facebook or contacts on LinkedIn, "second degree" if there is no direct relationship and a third user is in a first-degree relationship with each of the two users, and so on). The decision at node 530 can be based on the degree of separation. In this example, if the degree of separation is second or closer (branch 532), then personal vCard 534 (which can be the same as personal vCard 520) can be shared. If the degree of separation is greater than second (branch 536), then the information shared can be limited, e.g., to a social network ID 538 that identifies the user on the social network used to determine the separation. The users can later use this information to establish a direct connection on the social network, which can result in more information being shared at the next greeting event between their devices.

In one implementation, making the decision at node 530 can include obtaining, from the other device, the social network ID of the other device's user and supplying that ID to the social network to determine the degree of separation. This can involve a two-stage exchange of data objects. For instance, upon reaching decision node 530, a device can assume a greater-than-second-degree separation and send its own social network ID. If the other device does the same, each device can use the ID it receives to determine the actual degree of separation. If the separation turns out to be second degree or less, then the devices can each send personal vCard 534 to the other.

It will be appreciated that decision tree 500 is illustrative and that variations and modifications are possible. Any number or combination of contextual information items can be incorporated into a decision tree. For example, the frequency and/or recency of previous greeting events (rather than just the number) can be used. The type of greeting gesture executed by the user can also be considered; in some embodiments, a casual greeting gesture (e.g., high-five) can suggest a personal relationship and result in exchanging more personal information (e.g., personal contact data, photos of the user's family or pets), while a more formal greeting gesture (e.g., handshake) can suggest a professional relationship and result in exchanging professional information (e.g., work contact data).

An another example, the presence of certain other devices (referred to herein as reference devices) in the same area that are not participants in the greeting event can be indicative of the most likely context. For instance, if other devices detected in the area (although not necessarily in proximity when the greeting event occurs) belong to the user's business contacts, it can be inferred that the context is work-related and this can weigh in favor of exchanging work-related data. On the other hand, if other devices detected in the area belong to personal contacts (friends, family), then it can be inferred that the context is personal. It other devices detected in the area are not recognized as belonging to the user's contacts, it can be inferred that the user is among strangers, and this can weigh in favor of limiting the information exchanged.

As another example, in some embodiments, a user device can maintain a record indicating what data objects it has previously shared with specific other user devices, e.g., in response to previous greeting events. A user device can selectively determine not to send a data object to a particular device if it has previously sent that data object to that device. This can reduce duplication of data and the storage burden on the receiving device.

Another example of context-dependent selection of information to share can include the user's current physical activity. For instance, a wearable device may be able to determine that the user is exercising and/or to track the user's exercise performance (e.g., using accelerometer data and/or physiological sensor data such as a pulse sensor). In some embodiments, if a user who is or has recently been exercising performs a greeting gesture with another user who also is or has recently been exercising, the data exchanged can include exercise performance data. Exchange of this type of data can be further controlled based on additional context information (e.g., social network connection, past interactions with the other device, etc.), similarly to embodiments described above.

Further, while FIG. 5 illustrates a decision tree, other decision models can be used to implement a context-driven selection of data objects to be shared. Examples of other decision models include lookup tables; heuristic algorithms, in which various items of context information can be accorded weights usable to calculate an overall score reflecting the probability of a particular selection being appropriate, with the final selection being based on the overall score; or the like.

In some embodiments, a user can customize the decision rules and/or the information items to be shared under particular conditions, according to her own preferences. For example, wearable device 100 of FIG. 1 can provide a graphical user interface (e.g., as part of a settings-control program) allowing the user to indicate information-sharing preferences. Additionally or instead, a host device (e.g., mobile device 102 of FIG. 1) that may have a larger display area can provide the graphical user interface, and the host device can transmit the user's preferences to the wearable device, e.g., daring a synchronization operation. In some instances, the user can select from a list of pre-established rule sets and/or build a customized rule set using any combination of available decision variables defined by the wearable device (e.g., by information sharing code 236).

In the processes described above, the sharing of information happens automatically in response to detecting a greeting event between two devices. Context-based control over what information is shared by an automatic process can help to protect user privacy. In some embodiments, further protection of user privacy can be provided by allowing the user to verify that the information should be shared with a particular other user. This verification can occur in real time or after the fact.

In one implementation of real-time verification, upon detecting a greeting gesture, a user's device can generate an alert (e.g., vibrating or making a sound) and prompt the user to confirm that information should be shared or to select specific information to be shared. In some instances, such alerts may not be desirable as they can be disruptive to social interaction. Accordingly, after-the-fact verification can be provided in addition to or instead of real-time verification. After-the-fact verification can allow a user to review information about devices or users to which data objects have been sent and to indicate whether the other user should be allowed to access the data object; for instance, as described below, a data object can be sent in encrypted form, and the user whose device sent the object can determine later whether to provide the decryption key to the device that received the object.

Figure 6:
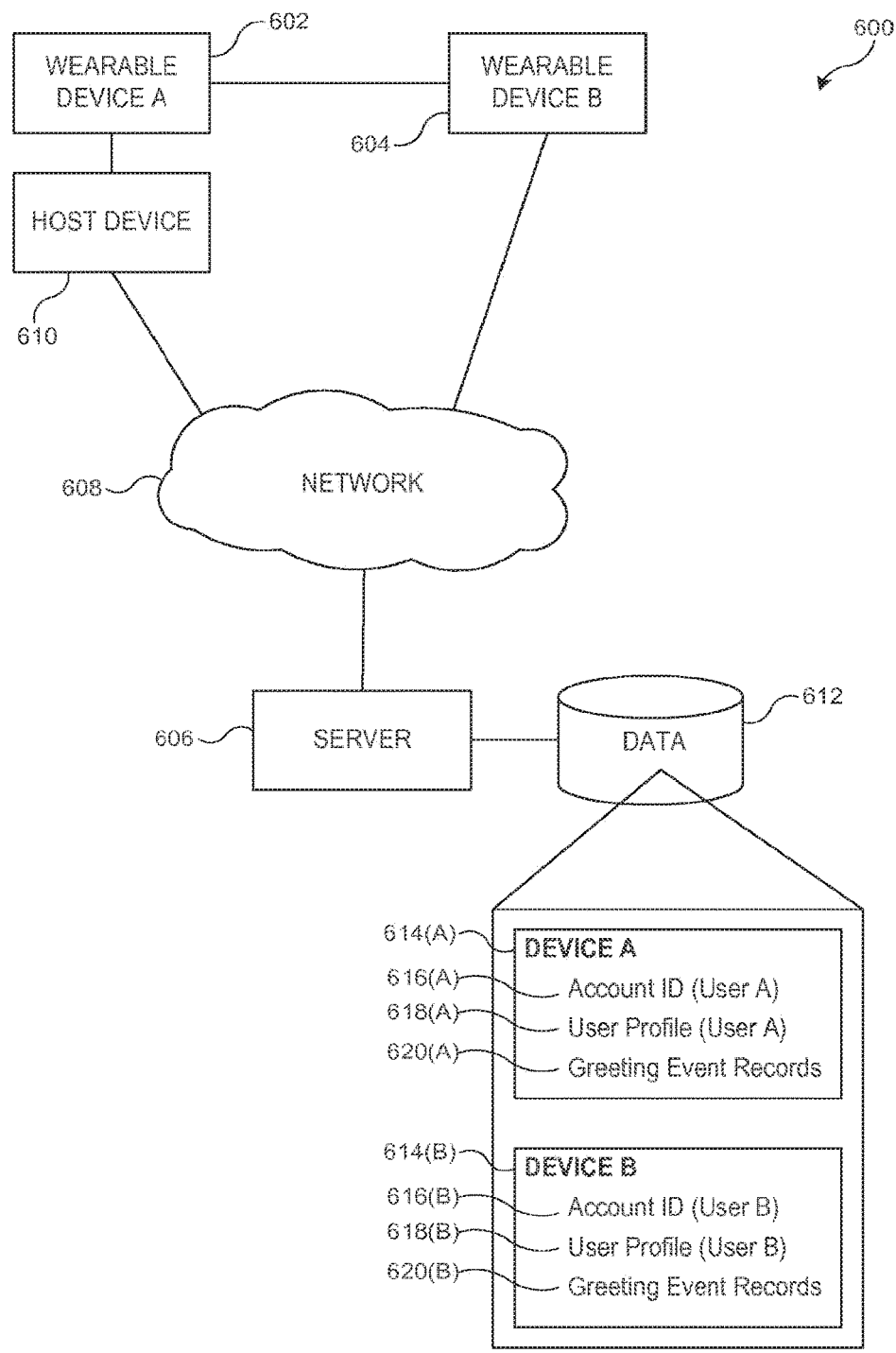
FIG. 6 is a simplified diagram of a system supporting after-the-fact verification of a data object exchange between wearable devices according to an embodiment of the present invention.

FIG. 6 is a simplified diagram of a system 600 supporting after-the-fact verification of a data object exchange between wearable devices according to an embodiment of the present invention. Wearable device A 602 and wearable device B 604 can be any two wearable devices (e.g., corresponding to any two of wearable devices 306, 308, 314, 316, 320, 322 of FIG. 3; each device can be implemented according to FIG. 2 or FIG. 1). In addition to communicating with each other, wearable devices 602 and 604 can also communicate with a server 606 via a network 608 (e.g., the Internet). In this example, wearable device B 604 communicates directly with network 608 while wearable device A 602 communicates with network 608 via a paired host device 610 (e.g., mobile device 102 of FIG. 1). It is to be understood that a wearable device might or might not use a host device for a wide-area network communication.

Server 606, which can be implemented using conventional network-based server technologies, can facilitate after-the-fact verification of data exchanges attempted by devices such as wearable devices 602 and 604. For example, data store 612 can contain device record 614 for various user devices. In this example, device record 614(A), pertains to wearable device A 602 and record 614(B) pertains to wearable device B 604. A new device record 614 can be created when a user registers a user device with server 606, e.g., upon acquiring the device or at any time thereafter. In some embodiments, a user can establish an account with a device management service provided using server 606 and can associate each of her devices with the account. Each device record 614(A), 614(B) can include an identifier of the device, the account ID 616(A), 616(B) of the user who registered the device and a user profile 618(A), 618(B) created by the user that can contain "basic" information about the user such as a name or handle or other identifier, a photo, a city or other location identifier, or the like. As described below, a user profile can be accessible to any other user at any time, and accordingly it may be desirable to limit the information included therein; in some embodiments, each user can control what information is included in her user profile 618, e.g., by using an interface provided by server 606 to define or modify the profile. The user profile can be associated with the account ID or with a specific device so that different devices belonging to the same user can have different user profiles.

Each device record 614(A), 614(B) can also store a list of greeting event records 620(A), 620(B) received from the device to which that device record 614 pertains (e.g., device A 602 for record 614(A)). Each greeting event record 620(A) can represent an instance in which device A 602 sent a data object to device B 604 in response to a greeting event. As described below, greeting event records 620(A) can be used to determine, after the fact of sending the data object, whether to grant device B 604 access to the data object.

In operation, device A 602 and device B 604 can each execute process 400 of FIG. 4 (or similar processes) to detect greeting events and select data objects to share. For instance, device A 602 may execute blocks 402-414 of process 400 to determine that a particular data object should be shared with device B 604.

Where after-the-fact verification is desired, device A 602 can encrypt the data object that is to be shared prior to sending it. Encryption can include generating an encryption key and applying the key to encrypt the data object such that it can only be decrypted and properly interpreted by a device that has the key (or a counterpart key in the case of asymmetric key encryption). Any type of encryption algorithm and key-generation technique can be used, including techniques known in the art. In some embodiments, the key can be a one-time pad (i.e., a key that is used only in one transaction), and the encryption algorithm can be symmetric. Devices A 602 can send the encrypted data object to device B 604 (continuing process 400) together with a "bundle ID" that can be generated by device A 602 and that can serve as a unique identifier for the data object; different data objects sent by device A 602 to device B 604 can have different bundle IDs. Device A 602 can also send a greeting event record to server 606. The greeting event record can include, e.g., identifiers of the two devices, the bundle ID, and the key (or other information usable to reconstruct the key). Server 606 can add the greeting event record received from device A 602 to greeting event records list 620(A).

Two-way data exchange can be supported; accordingly, device A 602 can also receive encrypted data objects from device B 604 (similarly to block 418 in FIG. 4), together with a bundle ID for each such object, and device A 602 can store the encrypted data object and the bundle ID in association with an identifier of device B (e.g., in local storage) at block 420.

To decrypt an encrypted object, a receiving device (e.g., device B) can obtain the key from server 606. In some embodiments, server 606 provides the key if the user of device B requests it and the user of device A approves release of the key. Examples of request and approval processes are described below.

Figure 7:
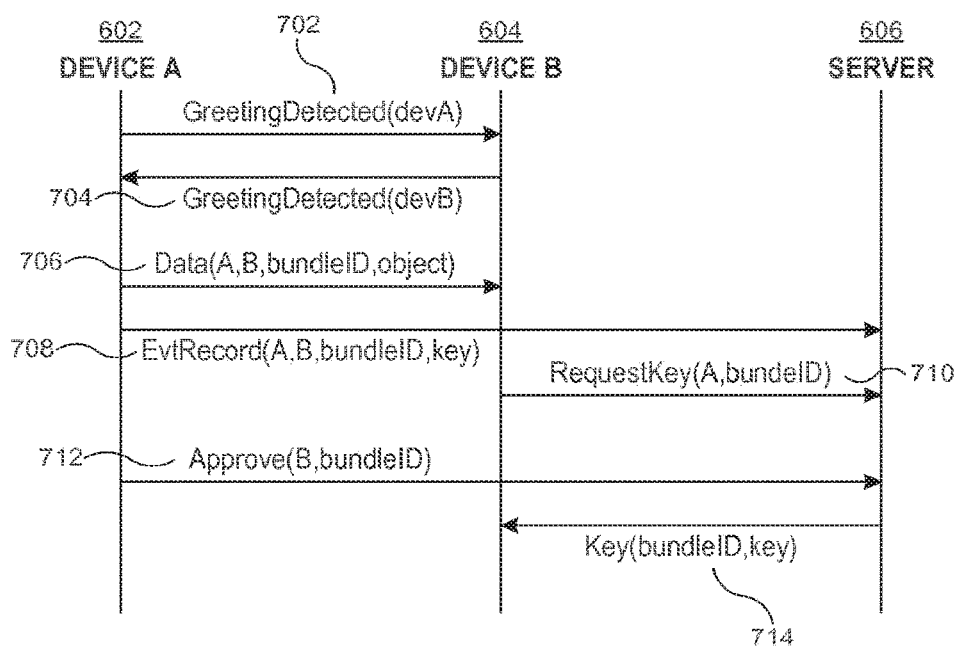
FIG. 7 is a message-passing diagram according to an embodiment of the present invention.

FIG. 7 is a message-passing diagram further illustrating the role of server 606 in the data exchange, for a data object sent by wearable device A 602 and received by wearable device B 604 according to an embodiment of the present invention. GreetingDetected messages 702 and 704 can correspond to communications at blocks 406 and 408 of process 400 and can be used to detect a greeting event. Data message 706 sent from wearable device A 602 to wearable device B 604 (e.g., at block 416 of process 400) can include an encrypted data object and a bundle ID (a unique identifier of the encrypted data object). Greeting event record 708 can be sent from wearable device A 602 to server 606 (either directly or via host device 610, depending on configuration) and can include identifiers of the two devices, the bundle ID, and the encryption key. The data object itself can be but need not be sent to server 606.

RequestKey message 710 can be sent by device B 604 to server 606 at any time after data message 706 is received (e.g., immediately after, or hours or day later). For example, as described below, after the greeting event, a user of device B 604 can review information about greeting events that occurred and select users whose information the user of device B would like to obtain. RequestKey message 710 can include an identifier of device A 602 and/or device B 604, as well as the bundle ID, to facilitate retrieval of the correct greeting event record 708.

Approve message 712 can be sent by device A 602 to server 606 at any time after data message 706 is sent (e.g., immediately after, or hours or days later). For example, as described below, after the greeting event, a user of device A 602 can review information about greeting events that occurred and select users to whom the user of device A would like to release her information. Approve message 712 can include an identifier to device A 602 and/or device B 604, as well as the bundle ID, to facilitate retrieval of the correct greeting event record 708.

If both a RequestKey message 710 and an Approve message 712 referencing the same data object (e.g., same device identifiers and bundle ID) are received, then server 606 can send Key message 714 to device B 604. Key message 714 can include either or both device identifiers, as well as the bundle ID and the key (or information usable by device B 604 to reconstruct the key). Once the key is received, device B 604 can decrypt the data object received in message 706 and access information contained therein.

It should be noted that the content and/or order of messages can be varied from that shown. For instance, a device that is sharing a data object can send the data object to the other device before or after sending a greeting event record to a server. RequestKey and Approve messages pertaining to a given data object can be received in either order, provided that server 606 does not release the key until both messages have been received. Also, while FIG. 7 illustrates device A providing data to device B, it is to be understood that the process can be bidirectional, and device B can also provide an encrypted data object to device A. In that case, device A would send a RequestKey message and device B would send an Approve message. In some embodiments, server 606 can construe a RequestKey message from one of two devices as an Approve message for any data objects sent to the other device; in other embodiments, separate consent is required for each direction of data transfer.

Figure 8:
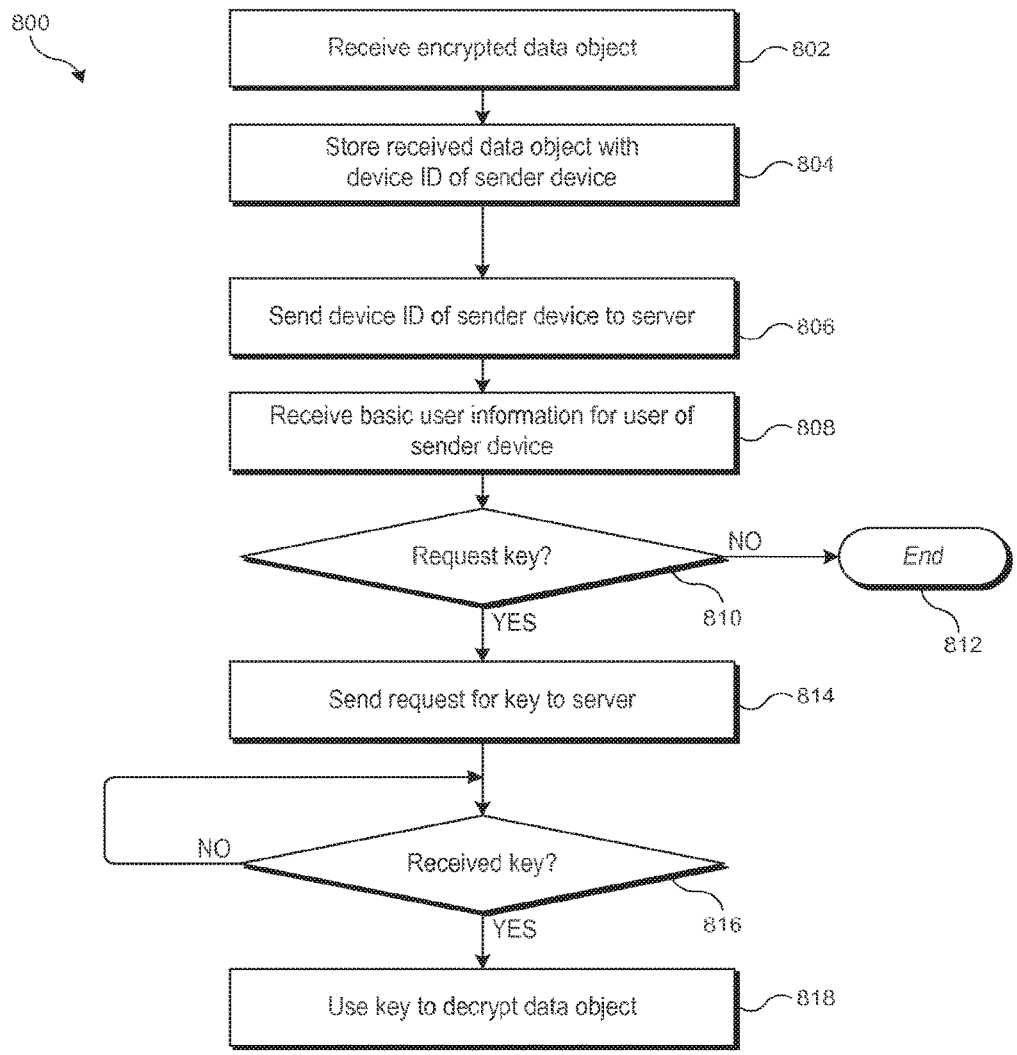
FIG. 8 is a flow diagram of a process for receiving encrypted data objects according to an embodiment of the present invention.

A further understanding of encrypted data exchange can be had by reference to FIG. 8, which is a flow diagram of a process 800 for receiving encrypted data objects according to an embodiment of the present invention. Process 800 can be implemented in a wearable device, e.g., wearable device B 604 of FIGS. 6 and 7.

Process 800 can begin at block 802 when wearable device B 604 receives an encrypted data object (e.g., from wearable device A). This can correspond to receiving data message 706 in FIG. 7. At block 804, wearable device B 604 can store the received data object together with the bundle ID and the identifier of the source device (e.g., wearable device A 602).

Blocks 802 and 804 can occur while devices A 602 and B 604 are in proximity, e.g., in response to a greeting event. The remainder of process 800 can occur at any later time, including times when device A 602 is not in communication with device B 604. For example, it is contemplated that a user of device B 604 can, after an event, review "basic" information about the users he met and select users whose information he wishes to obtain. (As described above, in some embodiments, the information will only be released with the other user's consent).

In some embodiments, to obtain basic information about another user, at block 806, wearable device B 604 can send the device ID of device A 602 to server 606. At block 808, wearable device B 604 can receive basic information about the user of device A 602. For example, server 606 can access record 614(A) and provide information from user profile 618(A). As noted above, user profile 618(A) can include basic information such as a name and photo. In some embodiments, the data object received from device A 602 can include basic information in an unencrypted format, and device B 604 can obtain the basic information by reading it from the received data objects.

At block 810, wearable device B 604 can determine whether to request the encryption key for the data object received from device A 602. For example, wearable device B 604 can present the basic information about the user of device A to the user of device B, and the user of device B can indicate whether to request the encryption key (and thereby potentially obtain additional information about the user of device A). If wearable device B 604 determines not to request the key, process 800 can end at block 812. Otherwise, at block 814, wearable device B 604 can send the request for the key (e.g., RequestKey message 710 of FIG. 7) to server 606.

At block 816, wearable device B 604 can determine whether the requested key has been received. The key can be received if server 606 determines that the user of device A has approved release of the key (an example of an approved process is described below). If so, then at block 818, wearable device B 604 can use the key to decrypt the data object received from device A 602 at block 802.

If, at the time wearable device B 604 requests the key, the user of wearable device A has not approved release, then process 800 can remain at block 816, waiting for the key. In some embodiments, waiting for the key can occur in the background, allowing wearable device B 604 to perform other operations. Thus, wearable device B 604 can wait indefinetely for a key. In some embodiments, wearable device B 604 may perform periodic cleanup, which can include deleting encrypted data objects for which no key has been received within a timeout period. The timeout period can be long enough so that it would be unlikely that the user of device A would suddenly decide to approve release of the key after the timeout period ends (e.g., a day, a week, or a month). In some embodiments, the user of device B can control the timeout period; in some embodiments, the user of device A can control the timeout period and server 606 can inform device B 604 when the timeout period expires.

Figure 9:
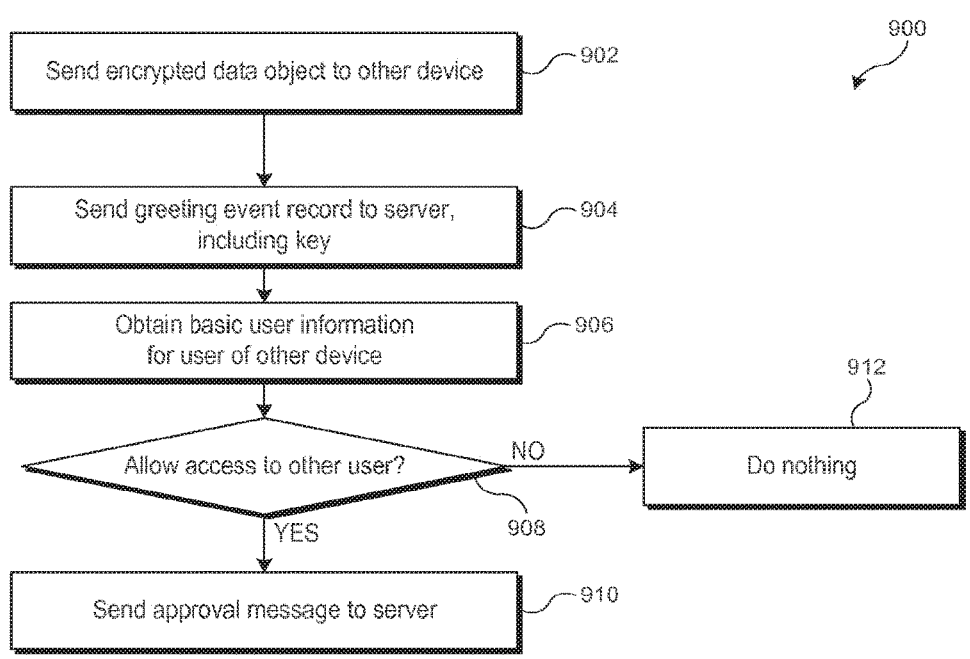
FIG. 9 is a flow diagram of a process for sending encrypted data objects according to an embodiment of the present invention.

Process 800 can be performed by any device that receives an encrypted data object from another device. Additionally or instead, a device that sends an encrypted data object can perform a complementary process for granting access to such data objects. FIG. 9 is a flow diagram of a process 900 for sending encrypted data objects according to an embodiment of the present invention. Process 900 can be implemented in a wearable device, e.g., wearable device A 602 of FIGS. 6 and 7.

Process 900 can begin at block 902 when wearable device A 602 sends an encrypted data object (e.g., to wearable device B 604). This can correspond to sending data message 706 in FIG. 7. Block 902 can occur while devices A 602 and B 604 are in proximity, e.g., in response to a greeting event. The remainder of process 900 can occur at any later time, including times when device A 602 is not in communication with device B 604.

At block 904, wearable device A 602 can send a greeting event record to server 606. This can correspond to sending event record message 708 in FIG. 7 and can occur, e.g., before or after sending the encrypted data object to wearable device B 604. In some embodiments, sending the greeting event record to server 606 occurs after sending the encrypted data object, as soon as a connection to server 606 can be established.

At block 906, wearable device A 602 can obtain basic user information for the user to whose device an encrypted data object was sent (e.g., the user of wearable device B 604). Similarly to process 800, it is contemplated that a user of device A 602 can, after an event, review limited information about the users she met and select users to whom she wishes to provide information. (As described above, in some embodiments the information will only be released if the other user requests it.) In some embodiments, wearable device A 602 can save the device IDs of devices to which it sent encrypted data objects, and block 906 can include sending a list of such device IDs to server 606 and receiving user profile 618(B) in response. In some embodiments, wearable device A 602 can rely on the greeting event records stored by server 606 and can send a request for basic information that does not include device IDs. In either case, server 606 can determine device IDs (either provided by device A 602 or stored in greeting event records associated with device A 602) and can use the device IDs to access user profiles and provide user profile information 618(B) to device A 602.

At block 908, wearable device A 602 can determine whether to allow the user of device B to access the encrypted data object. For example, wearable device A 602 can present the basic information about the user of device B to the user of device A, and the user of device A can indicate whether server 606 should release the encryption key to device B (and thereby allow the user of device B to access additional information about the user of device A). If wearable device A 602 determines to allow access, then at block 910, wearable device A 602 can instruct server 606 to release the key, e.g., by sending Approve message 712 of FIG. 7 to server 606. Otherwise, at block 912, process 900 can end. In some embodiments, wearable device A 602 can determine that wearable device B should never be granted access to the data object and can so notify server 606. Depending on implementation, server 606 can mark the greeting event record in question to indicate this decision, delete the greeting event record, and/or notify wearable device B that access will not be granted.

Figure 10:
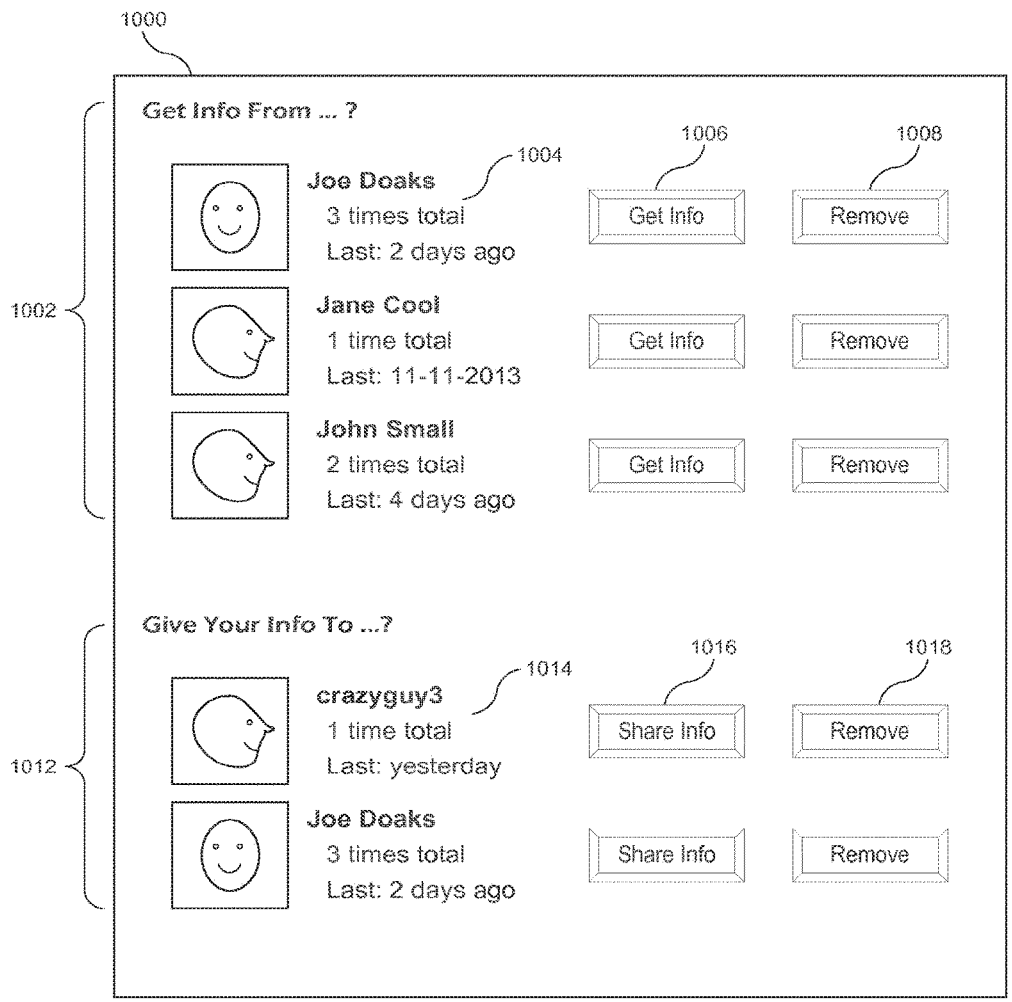
FIG. 10 shows a user interface screen that can be used to manage access to encrypted shared data objects according to an embodiment of the present invention.

Decisions to request or grant access can be based on user input. FIG. 10 shows a user interface screen 1000 that can be used to manage access to encrypted shared data objects according to an embodiment of the present invention. Screen 1000 can be presented, e.g., in connection with block 810 of process 800 and/or block 908 of process 900. Screen 1000 can be presented on a wearable device (e.g., either of wearable devices A 602 and B 604) or on a host device associated with a wearable device. In the latter case, the host device may have a larger screen that can present more information at once. In some instances, screen 1000 can be made scrollable and/or divided into sections that can presented as separate pages with appropriate navigation control as desired.

Screen 1000 can include section 1002 that presents information records permitting to encrypted data objects received by the user's device. In this example, the information record can include background information 1004 about a user whose device sent the encrypted data object, such as a name and photograph. Background information 1004 can include basic user information that can be obtained as described above with reference to blocks 806 and 800 of process 800. Background information 1004 can also include other information that the user's device may have recorded in connection with the greeting event (or receipt of the data object), such as the time, location, and/or occasion of the most recent greeting event, number of previous greeting events, etc. For each information record, an input control 1006 can allow the user to request more information; operation of input control 1006 can result in sending a RequestKey message to server 606. Input control 1008 can allow the user to indicate a lack of interest in obtaining further information; operation of input control 1008 can result in deleting the received data object and/or notifying server 606 of the user's lack of interest.

Screen 1000 (or a separate screen) can also include section 1012 that presents information records pertaining to encrypted data objects sent by the user's device. In this example, the information record can include background information 1014 about a user to whose device the encrypted data object was sent, such as a name and photograph. Background information 1014 can include basic user information that can be obtained as described above with reference to block 906 of process 900. Background information 1014 can also include other information that the user's device may have recorded in connection with the greeting event (or sending of the data object), such as the time, location, and/or occasion of the most recent greeting event, number of previous greeting events, etc. For each information record, an input control 1016 can allow the user to authorize sharing of information with the other user; operation of input control 1016 can result in sending an Approve message to server 606. Input control 1018 can allow the user to indicate the refusal to share information with the other user; operation of input control 1018 can result in notifying server 606 of the user's lack of interest. As noted above, server 606 might or might not notify the other user of the decision.

It will be appreciated that the after-the-fact verification systems and methods described herein are illustrative and that variations and modifications are possible. Process steps or blocks described as sequential may be executed in parallel order of execution may be varied, and steps or blocks may be modified, combined, added or omitted. Message sequences and/or content can be modified. User interface elements can also be added, omitted, modified, or combined. In some embodiments, rather than separating requesting access to received data objects and granting access to sent data objects, a single list of people the user has met can be presented, and the user can elect whether to share information or not; in this case, the election to share can include both a request for a key (if the user's device received a data object from the other user's device) and an approval to release a key (if the user's device sent a data object to the other user's device).

Further, in the embodiments described above, received encrypted data objects are stored by the wearable devices that received them and the server only provides the key; in other implementations, a wearable device can forward a received encrypted data object to a server, and the server can decrypt the data object and return the decrypted data object to the wearable device (if the source user approves the data exchange).

In addition to or instead of facilitating information exchange between devices participating in a greeting event, some embodiments of the present invention can leverage greeting events to generate information that can be made available to third parties. For instance, a greeting event between two devices can indicate that the users of those devices were in the same place at the same time, and this information can be used to generate content for a social media service (e.g., a microblog post, a social network status message, etc.).

Figure 11:
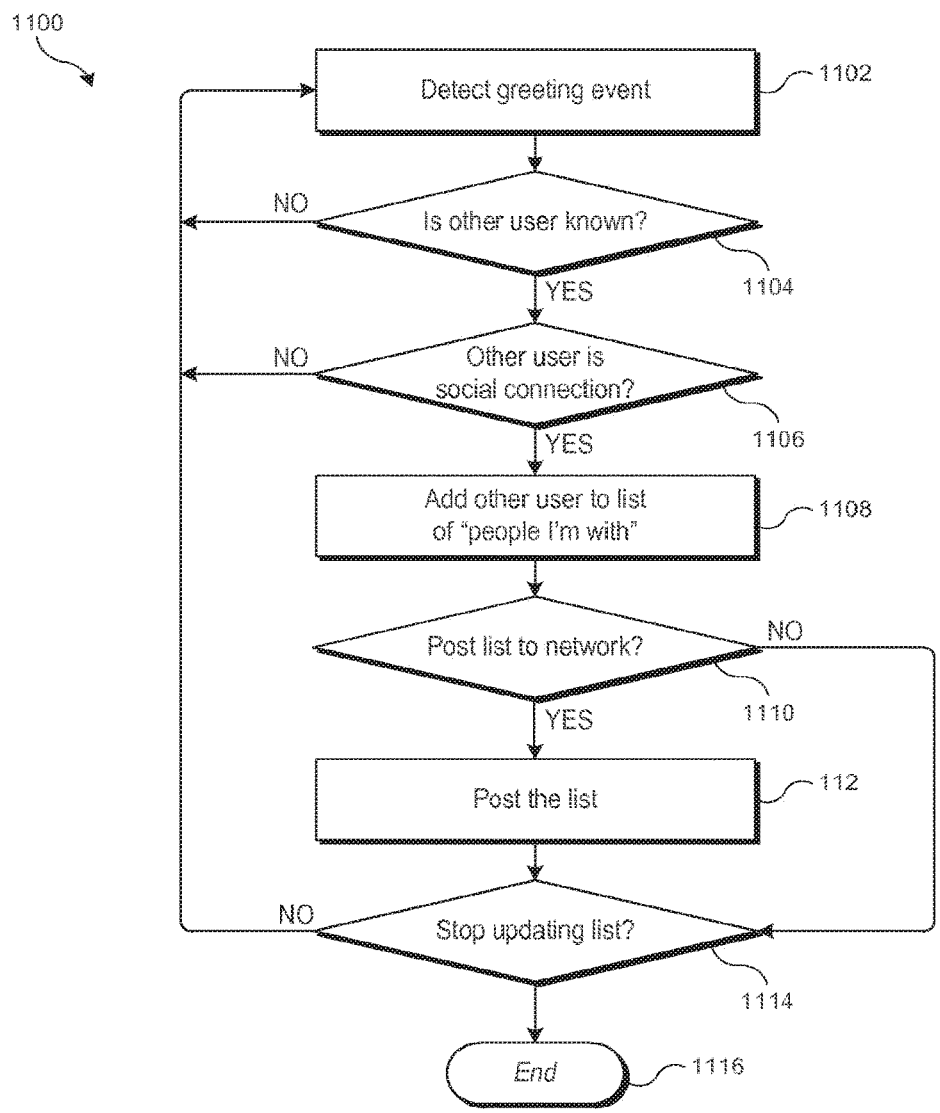
FIG. 11 is a flow diagram of a process for generating social-media content based on a greeting event according to an embodiment of the present invention.

FIG. 11 is a flow diagram of a process 1100 for generating social-media content based on a greeting event according to an embodiment of the present invention. Process 1100 can be implemented in any device that can participate in a greeting event (including any of wearable devices 100, 200, 300, 308, 314, 316, 320, 322, 602, 604).

Process 1100 can begin at block 1102, when a device detects a greeting event. Detection of a greeting event can be similar to blocks 402-408 of FIG. 4. At block 1104, the the device can determine whether the user of the other device is already known (e.g., whether the other device is associated with one of the user's contacts). If not, process 1100 can return to block 1102 to detect another greeting event.

At block 1106, the device can determine whether the other user is a social-network connection of the device's own user. For example, a social-network connection can be someone with whom the device's user has expressly established a relationship by interacting with the social network service such as Facebook friends or the like. In some embodiments, block 1106 can include communicating with the social network service to determine the other user's relationship status. Connections recognized at block 1106 can be limited to connections with one degree of separation or extended more broadly (e.g., to two degrees of separation). If the other user is not a social-network connection, then process 1100 can return to block 1102 to detect another greeting event.

If the other user is a social-network connection, then at block 1108, the other user can be added to a list of "people I'm with" that is being constructed for the user whose device is executing process 1100. For instance, the user can launch process 1100 on entering a venue such as a restaurant or party location. Upon launch, the list can be initialized in an empty state and users can be added to the list an they are greeted and recognized. The list can continue to be updated by adding more users while the device executing process 1100 remains at the venue.

At block 1110, process 1100 can determine whether to post the list to the social network. Various criteria can be used. For example, an updated version of the list can be posted each time another user is added; the list can be posted in response to express user input; or the list can be posted when the user is detected leaving the venue. If the list is not to be posted, process 1100 can return to block 1102 to detect another greeting event.

If the list is to be posted, process 1100 can proceed to post the list at block 1112. Posting the list can include automatically generating a message that can include the list and other information specific to the occasion, such as "I'm with <usernames> at <venue>."

Regardless of whether the list is posted, at block 1114, process 1100 can determine whether to stop updating the list. For example, updating can stop when user input expressly indicates that updating should stop, or when the device executing process 1100 leaves the venue. Process 1100 can then end (block 1116). In some embodiments, a decision to stop updating the list and/or to end process 1100 can occur at any point in the process.

It will be appreciated that process 1100 is illustrative and that variations and embodiments are possible. Steps described as sequential may be executed in parallel, order of steps may be varied, and steps may be modified, combined, added or omitted. In some embodiments, portions of process 1100 can be implemented on different devices. For example, a wearable device can send the list (or updates to the list) to a paired host device (e.g., the user's mobile phone), and the user can review the list and control posting of the list from the paired host device. Process 1100 can also be combined with other processes described herein in relation to greeting events (e.g., process 400), and the same greeting event can trigger both an exchange of information between devices and generation of social-media content.

While the invention has been described with respect to specific embodiments, one skilled in the art will recognize that numerous modifications are possible. For example, a variety of different mobile devices and wearable devices can be used. Further, while the description above may refer to the devices in a greeting event as being "wearable," a particular form-factor or manner of attachment to the user's person is not required, and a user device can include any device that can be worn or carried on the user's person and that is capable of detecting a greeting event.

In some embodiments, a wearable device can operate as a "thin client" for a host device. For instance, a wearable device with a wristwatch-like form factor can have proximity sensors and accelerometers to detect greeting events and can communicate over short distances with a paired host device that can be carried or worn elsewhere on the user's person (e.g., in a pocket or bag). The host device can provide other functionality that may or may not be available within the wearable device such as an enhanced user interface, GPS receiver, Internet connectivity (e.g., via Wi-Fi, cellular data networks or the like), additional processing power, context information such as a user's calendar or contacts list, and so on. Where this is the case, any or all of the operations associated with analyzing sensor data to detect a greeting event, selecting data objects to share, sending data objects to another device, and/or receiving data objects from another device can be performed using the host device. According, references to operations performed by a wearable device should be understood as including operations performed by a host device with which the wearable device can be paired and/or through cooperation or interoperation between the wearable device and the host device, and a "user device" as used herein can include the combination of a wearable device and a paired host device belonging to the same user.

Further, although the term "exchange" of sharable data objects is used to describe certain interactions between user devices, it is to be understood that two-way exchange is not required in all or even any instances. In some embodiments, selection of data objects to share with another user devices can be context-dependent (examples are described below), and it is possible that one user device may send a data object without receiving a data object in return, or vice versa. One-way or two-way data-object exchange can be performed between any two user devices capable of detecting greeting events (e.g., as described above) as long as at least one of the user devices can select and send a data object to the other. In addition, in some embodiments, more than two user devices can participate in a single greeting event. For example, a group of three or more users might all bow to each other. Where a first user device determines that more than one other device in proximity detected the same greeting gesture, the first user device can select one or more data objects to share with each of the other user devices, and the selection can be made on a per-device basis (e.g., using context-based criteria as described above).

Some embodiments may make use of encrypted data objects. In some instances, a determination to encrypt can be based on context information and/or the nature of the data being shared. For instance, encryption can be bypassed if the user is at a work-related event where work-related data is being shared and enabled if the user is at a bar or other venue where the persons encountered are likely to include strangers. As another example, encryption can be enabled if the user devices have no history of previous greeting events and disabled if the user devices have sufficient history (e.g., a minimum number of previous greeting events).

The foregoing description may make reference to specific examples of a wearable device (e.g., a wrist-worn device) and/or a host device (e.g., a mobile phone or smart phone). It is to be understood that these examples are illustrative and not limiting; other user devices can be substituted and can implement similar functional blocks and/or algorithms to perform operations described herein and/or other operations.

Embodiments of the present invention, e.g., in methods, apparatus, computer-readable media and the like, can be realized using any combination of dedicated components and/or a programmable processors, and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the invention has been described with respect to specific embodiments, it will be appreciated that the invention is intended to cover all modifications and equivalents within the scope of the following claims.

What is claimed is:

1. A method comprising:
    detecting, at a first user device, a greeting event based at least in part on:
        proximity to a second user device;
        first data that includes first acceleration data indicative of first acceleration measurements collected at a first accelerometer at the first user device; and
        second data indicative of second acceleration measurements collected at a second accelerometer at the second user device;
    in response to detecting the greeting event, accessing, by the first user device, third data that includes a geographic location of the first user device determined using GPS signals received at the first user device;
    determining, by the first user device, context information for the greeting event based on the third data, the context information indicating whether the geographic location is associated with a work context;
    selecting, by the first user device, an information item to be sent to the second user device, wherein the information item corresponds to work contact information when the context information indicates that the geographic location is associated with the work context, and wherein the information item corresponds to personal contact information when the context information does not indicate that the geographic location is not associated with the work context; and
    sending, by the first user device, the selected information item to the second user device.

2. The method of claim 1 further comprising:
    subsequently to detecting the greeting event and while the first user device remains in proximity to the second user device, receiving, by the first user device, a data object from the second user device.

3. The method of claim 1 wherein the third data further includes one or more of:
    presence or absence of a reference electronic device other than the first and second user devices;
    schedule data pertaining to a user of the first user device; or
    activity data pertaining to the user of the first user device.

4. The method of claim 1 wherein detecting a greeting event includes:
    detecting, based on the first data, that the first user device experiences an acceleration consistent with execution of the greeting event by a user of the first user device while the first user device is in proximity to the second user device; and
    receiving a communication from the second user device, the received communication including the second data, and the second data indicating that the second user device experienced an acceleration consistent with execution of the greeting event by a user of the second user device.

5. The method of claim 4 wherein the acceleration consistent with execution of the greeting event by the user of the first user device includes an acceleration consistent with one or more of:
    a handshake;
    a bow; or
    a high-five.

6. A wearable electronic device comprising:
a motion sensor operable to detect a movement of the wearable electronic device;
a wireless communication interface operable to communicate with another electronic device;
a storage subsystem configured to store data including a plurality of shareable data objects; and
a processing subsystem coupled to the motion sensor, the wireless communication interface, and the storage subsystem, the processing subsystem configured to:
 detect, based at least in part on a signal from the wireless communication interface, that another electronic device is in proximity to the wearable electronic device;
 detect, based at least in part on first data that includes a signal from the motion sensor, an occurrence of a greeting gesture while the other electronic device is in proximity to the wearable electronic device;
 in response to detecting the greeting gesture, access second data that includes other data that includes a geographic location of the wearable electronic device determined using GPS signals received at the wearable electronic device;
 determine one or more items of context information based on the second data, the one or more items of context information indicating whether the geographic location is associated with a work context;
 select a shareable data object from the plurality of shareable data objects, wherein the shareable data object corresponds to work contact information when the one or more items of context information indicates that the geographic location is associated with the work context, and wherein the shareable data object corresponds to personal contact information when the one or more items of context information does not indicate that the geographic location is not associated with the work context; and
 send via the wireless communication interface, the shareable data object to the other electronic device.

7. The wearable electronic device of claim 6 wherein the second data further includes one or more of:
 presence or absence of a reference electronic device other than the wearable electronic device and the other electronic device;
 schedule data pertaining to a user of the wearable electronic device; or
 activity data pertaining to the user of the wearable electronic device.

8. The wearable electronic device of claim 6 wherein the second data includes a number of greeting gestures previously detected by the wearable electronic device while in proximity to the other electronic device.

9. The wearable electronic device of claim 6 wherein the second data includes whether a social-network connection has been established between a user of the wearable electronic device and a user of the other electronic device.

10. The wearable electronic device of claim 6 wherein the processing subsystem is further configured such that detecting the occurrence of the greeting gesture includes receiving a communication from the other electronic device confirming that the other electronic device also detected the occurrence of the greeting gesture.

11. The wearable electronic device of claim 6 wherein the wearable electronic device is wearable on a user's wrist.

12. The wearable electronic device of claim 6 wherein the motion sensor includes an accelerometer.

13. A non-transitory computer readable storage medium storing program code instructions that, when executed by a processor in a wearable electronic device, cause the processor to execute a method comprising:
 detecting that another electronic device is in proximity to the wearable electronic device;
 detecting a greeting event based at least in part on:
  proximity to the other electronic device;
  first data that includes first acceleration data indicative of first acceleration measurements collected at the wearable electronic device; and
  second data indicative of second acceleration measurements collected at the other electronic device;
 in response to detecting the greeting event, accessing third data, the third data that including a geographic location of the wearable electronic device determined using GPS signals received at the wearable electronic device;
 determining context information for the greeting event based on the third data, the context information indicating whether the geographic location is associated with a work context;
 selecting an information item to be sent to the other electronic device, wherein the information item corresponds to work contact information when the context information indicates that the geographic location is associated with the work context, and wherein the information item corresponds to personal contact information when the context information does not indicate that the geographic location is not associated with the work context; and
 sending the selected information item to the other electronic device.

14. The non-transitory computer readable storage medium of claim 13 wherein the context information further includes activity data pertaining to a user of the wearable electronic device.

15. The non-transitory computer readable storage medium of claim 13 wherein the third data includes information indicating presence or absence of a reference electronic device other than the wearable electronic device and the other electronic device.

16. The non-transitory computer readable storage medium of claim 13 wherein the third data includes schedule data pertaining to a user of the wearable electronic device.

17. The non-transitory computer readable storage medium of claim 13 wherein detecting the greeting event includes determining that the first acceleration data is consistent with a profile for a handshake gesture or a high-five gesture.

\* \* \* \* \*